(12) United States Patent
Uchida et al.

(10) Patent No.: US 8,999,220 B2
(45) Date of Patent: Apr. 7, 2015

(54) METHOD AND APPARATUS FOR MANUFACTURING RESIN STAMPER, IMPRINT METHOD, MAGNETIC RECORDING MEDIUM, AND MAGNETIC RECORDING/REPRODUCING APPARATUS

(75) Inventors: Hiroshi Uchida, Ichihara (JP); Masato Fukushima, Chiba (JP); Yuko Sakata, Tokyo (JP)

(73) Assignee: Showa Denko K.K., Tokyo (JP)

( * ) Notice: Subject to any disclaimer, the term of this patent is extended or adjusted under 35 U.S.C. 154(b) by 142 days.

(21) Appl. No.: 12/675,609

(22) PCT Filed: Oct. 16, 2008

(86) PCT No.: PCT/JP2008/069175
§ 371 (c)(1),
(2), (4) Date: Feb. 26, 2010

(87) PCT Pub. No.: WO2009/051272
PCT Pub. Date: Apr. 23, 2009

(65) Prior Publication Data
US 2010/0239889 A1    Sep. 23, 2010

(30) Foreign Application Priority Data

Oct. 19, 2007  (JP) ................................ 2007-273006
Nov. 19, 2007  (JP) ................................ 2007-299900
Jan. 18, 2008  (JP) ................................ 2008-009396

(51) Int. Cl.
*B05D 5/00* (2006.01)
*B29C 43/40* (2006.01)
(Continued)

(52) U.S. Cl.
CPC .............. *B29C 43/40* (2013.01); *B29B 13/023* (2013.01); *B29C 43/021* (2013.01); *G11B 5/855* (2013.01); *B29C 35/0805* (2013.01); *B29C 2043/025* (2013.01); *B29L 2017/003* (2013.01)

(58) Field of Classification Search
USPC ......... 264/227, 219, 225, 226, 220, 496, 138, 264/154, 155; 428/446
See application file for complete search history.

(56) References Cited

U.S. PATENT DOCUMENTS 4,407,646 A     10/1983   Bricot et al.
6,659,759 B2 *  12/2003   Anzai et al. ................... 425/515
(Continued)

FOREIGN PATENT DOCUMENTS

EP      0 255 088 A2     2/1988
JP      57-35095 B2      7/1982
(Continued)

OTHER PUBLICATIONS

Kamata et al., JP 2005-286222 A machine translation, Oct. 13, 2005.*

(Continued)

*Primary Examiner* — Galen Hauth
(74) *Attorney, Agent, or Firm* — Sughrue Mion, PLLC

(57) ABSTRACT

The present invention provides a technique capable of manufacturing a resin stamper at a low cost. A method of manufacturing a plate-shaped resin stamper includes: pressing a resin composite base material against a mother stamper having a pattern formed on the surface thereof by compression molding to transfer the pattern of the mother stamper to the composite base material; and punching the composite base material. In the manufacturing method, the resin composite base material includes at least one curing resin. In addition, during the compression molding, a portion of the composite base material is cured by active energy beams or heat, the pattern is transferred to the composite base material, and the composite base material is punched, thereby manufacturing the resin stamper.

19 Claims, 15 Drawing Sheets

(51) Int. Cl.
*B29B 13/02* (2006.01)
*B29C 43/02* (2006.01)
*G11B 5/855* (2006.01)
*B29C 35/08* (2006.01)
*B29L 17/00* (2006.01)

(56) References Cited

U.S. PATENT DOCUMENTS

| | | | |
|---|---|---|---|
| 7,067,207 | B2 | 6/2006 | Kamata et al. |
| 7,074,341 | B1 * | 7/2006 | Kurataka et al. ............... 216/22 |
| 7,147,790 | B2 | 12/2006 | Wachenschwanz et al. |
| 7,549,209 | B2 | 6/2009 | Wachenschwanz et al. |
| 7,642,334 | B2 | 1/2010 | Uchida et al. |
| 2004/0150135 | A1 * | 8/2004 | Hennessey et al. ........... 264/293 |
| 2004/0168559 | A1 | 9/2004 | Ide et al. |
| 2005/0146078 | A1 * | 7/2005 | Chou et al. .................... 264/293 |
| 2006/0214326 | A1 * | 9/2006 | Kim et al. ..................... 264/225 |
| 2009/0082518 | A1 | 3/2009 | Uchida et al. |

FOREIGN PATENT DOCUMENTS

| | | | |
|---|---|---|---|
| JP | 2-155628 | A | 6/1990 |
| JP | 02-289311 | A | 11/1990 |
| JP | 02-310027 | A | 12/1990 |
| JP | 05-047048 | A | 2/1993 |
| JP | 9-511710 | A | 11/1997 |
| JP | 2002-288895 | A | 10/2002 |
| JP | 2003-331481 | A | 11/2003 |
| JP | 2004-504718 | A | 2/2004 |
| JP | 2004-164692 | A | 6/2004 |
| JP | 2004-178793 | A | 6/2004 |
| JP | 2004-178794 | A | 6/2004 |
| JP | 2005-122853 | A | 5/2005 |
| JP | 2005286222 | A * | 10/2005 |
| JP | 2006-233009 | A | 9/2006 |
| JP | 2006-312729 | A | 11/2006 |
| JP | 2006-348278 | A | 12/2006 |
| JP | 2007-069462 | A | 3/2007 |
| JP | 2007-307752 | A | 11/2007 |
| JP | 2007-328908 | A | 12/2007 |
| JP | 2007-536107 | A | 12/2007 |
| JP | 2008-188953 | A | 8/2008 |
| JP | 2009-119695 | A | 6/2009 |
| TW | 468150 | | 12/2001 |
| TW | I227485 | | 2/2005 |
| TW | I283864 | | 7/2007 |
| WO | 97/06012 | A1 | 2/1997 |
| WO | 02/07199 | A1 | 1/2002 |
| WO | 2005/105401 | A1 | 11/2005 |
| WO | 2006/101235 | A1 | 9/2006 |

OTHER PUBLICATIONS

European Office Action issues in European Application No. 08839469.7 mailed Jul. 12, 2012.
Notice of Allowance dated Oct. 8, 2013 issued in corresponding application No. 2008-267530.
Taiwanese Office Action dated Aug. 28, 2013 issued in corresponding application No. 097138741.
Notice of Allowance Issued in Japanese Application No. 2008-267529 dated Nov. 5, 2013.
Database WPI, XP-002512989, Abstracting JP 2002-288895 A.
Database WPI, XP-002512990, Abstracting WO 2006/101235 A1.
Japanese Office Action issued in application No. 2008-267530 dated Jan. 22, 2013.
Japanese Office Action issued in application No. 2008-267529 dated Feb. 19, 2013.

* cited by examiner

METHOD AND APPARATUS FOR MANUFACTURING RESIN STAMPER, IMPRINT METHOD, MAGNETIC RECORDING MEDIUM, AND MAGNETIC RECORDING/REPRODUCING APPARATUS

TECHNICAL FIELD

The present invention relates to a method and apparatus for manufacturing a resin stamper that has a pattern transferred thereto and a positioning hole formed at the center or the edge thereof, a magnetic recording medium manufactured by the method and apparatus, and a magnetic recording/reproducing apparatus including the magnetic recording medium.

Priority is claimed on Japanese Patent Application No. 2007-273006, filed Oct. 19, 2007, Japanese Patent Application No. 2007-299900, filed Nov. 19, 2007, and Japanese Patent Application No. 2008-009396, filed Jan. 18, 2008, and the contents of which are incorporated herein by reference.

BACKGROUND ART

In recent years, the application range of magnetic recording devices, such as magnetic disk devices, flexible disk devices, and magnetic tape devices, has been significantly widened, and the importance thereof has increased. In addition, a technique for improving the surface recording density of magnetic recording media used for the devices has been developed. In particular, the introduction of an MR head and a PRML technique significantly increases the surface recording density. In recent years, for example, a GMR head and a TMR head have been developed to increase the surface recording density at an increasing rate of about 100% per year. In addition, there is a demand for further increasing the surface recording density of the magnetic recording medium. Therefore, in order to meet the demand, it is necessary to improve the coercive force of a magnetic recording layer, increase a signal-to-noise ratio (SNR), and increase the resolution thereof. In addition, there is an attempt to improve a linear surface recording density and a track density, thereby increasing the surface recording density.

In recent years, the track density of the magnetic recording device has reached 110 kTPI. However, when the track density increases, magnetic recording information items in adjacent tracks interfere with each other, and a magnetization transition area at the boundary therebetween serves as a noise source, which may decrease the SNR. The lowering of the SNR causes a reduction in bit error rate (bit error rate), which makes it difficult to increase the surface recording density.

In order to increase a surface surface recording density, it is necessary to greatly reduce the size of each recording bit on the magnetic recording medium and ensure a large amount of saturated magnetization and a large magnetic film thickness for each recording bit. However, when the size of the recording bit is greatly reduced, a minimum magnetization volume per bit is reduced, which may cause recorded data to be erased due to magnetization reversal caused by heat fluctuation.

In order to decrease the distance between tracks, the magnetic recording device requires a high-precision track servo technique and generally uses a method of performing recording with a large width and reproducing with a width that is smaller than that during recording in order to minimize the influence of adjacent tracks. The method can minimize the influence between adjacent tracks, but it is difficult to obtain a sufficient reproduction output, which makes it difficult to ensure a sufficiently high SNR.

As a method of solving the problem of the heat fluctuation and ensuring a sufficient SNR or a sufficient output, the following has been attempted: a technique for forming an uneven pattern on the surface of a recording medium along tracks or forming a non-magnetic portion between adjacent tracks to physically separate the tracks, thereby increasing track density, which is referred to as a discrete track method.

As an example of a discrete track magnetic recording medium, a magnetic recording medium is known in which a magnetic recording layer is formed on a non-magnetic substrate having an uneven pattern formed thereon to form magnetic recording tracks physically separated from each other and a servo signal pattern (for example, see Patent Document 1). In the magnetic recording medium, a ferromagnetic layer is formed on the surface of the substrate having a plurality of uneven portions formed thereon with a soft magnetic layer interposed therebetween, and a protective film is formed on the ferromagnetic layer. In the magnetic recording medium, a magnetic recording region is formed in a convex region so as to be magnetically isolated therefrom.

According to the magnetic recording medium, it is possible to prevent the occurrence of a magnetic domain wall in the soft magnetic layer. Therefore, the magnetic recording medium is hardly affected by the thermal fluctuation, and there is no interface between adjacent signals. As a result, it is possible to form a high-density magnetic recording medium with little noise.

Examples of the discrete track method include a method of forming a magnetic recording medium having a multi-layer structure and then forming tracks, and a method of forming an uneven pattern on the surface of a substrate directly or with a thin film for forming tracks interposed therebetween and then forming a thin film of a magnetic recording medium (for example, see Patent Documents 2 and 3). The latter is referred to as a pre-emboss method or a substrate processing type. In the pre-emboss method, a physical process is completely performed on the surface of a medium before the medium is formed. Therefore, it is possible to simplify a manufacturing process and prevent a medium from being contaminated during the manufacturing process. However, since the uneven pattern formed on the substrate is transferred to the formed film, the floating posture and the floating height of a recording/reproducing head that records or reproduces data while floating from the medium become unstable.

Meanwhile, in recent years, there is an increasing demand for improving the operating speed of a semiconductor device and reducing the power consumption thereof, and a technique for incorporating a system LSI into the semiconductor device has been demanded. In order to meet the demands, with the development of a lithography technique, which is the core technology of a semiconductor device process, the cost of an apparatus has increased.

In recent years, an exposure lithography technique has been changed from a KrF laser lithography technique having a minimum line width of 130 nm to an ArF laser lithography technique having a resolution that is higher than that of the KrF laser lithography technique.

The minimum line width of the ArF laser semiconductor technique in the mass production stage is 100 nm. However, lithography devices having minimum line widths of 90 nm, 65 nm, and 45 nm were manufactured in 2003, 2005, and 2007.

In order to further reduce the minimum line width, the following techniques are expected: a $F_2$ laser ($F_2$ excimer laser) lithography technique; an extreme ultraviolet lithography (EUVL) technique; an electron beam projection lithography (EPL) technique; and an X-ray lithography technique.

These lithography techniques succeed in manufacturing a pattern in the range of 40 nm to 70 nm.

However, with the development of fine pattern lithography, the cost of the exposure apparatus has exponentially increased, and the cost of a mask for obtaining the same resolution as the light wavelength used has suddenly increased. Therefore, nanoimprint lithography has drawn attention as an inexpensive processing technique having a resolution of about 10 nm (see Patent Document 4).

[Patent Document 1] JP-A-2004-164692
[Patent Document 2] JP-A-2004-178793
[Patent Document 3] JP-A-2004-178794
[Patent Document 4] JP-A-2004-504718

DISCLOSURE OF THE INVENTION

Problems that the Invention is to Solve

The discrete track magnetic recording medium has a structure in which a recording magnetic layer is formed on a non-magnetic substrate having an uneven pattern formed thereon, a protective layer is formed on the recording magnetic layer, and a lubricant layer is formed on the protective layer. In the magnetic recording medium having the above-mentioned structure, as the thickness of the protective layer is decreased, a distance between a head and a magnetic layer is decreased. Therefore, the input/output intensity of signals from the head increases, and it is possible to increase the surface recording density. In addition, the bit density of the track depends on the floating height of the head that slides on the protective layer having an uneven pattern formed thereon. Therefore, it is an important problem to stabilize the floating posture of the head, in order to increase the surface recording density.

In a method of manufacturing a magnetic recording medium using general sputtering, the uneven pattern of a substrate is transferred to a magnetic layer or a protective layer. When the protective layer is formed on the surface of the magnetic layer formed on an uneven substrate by sputtering, the protective layer is deposited so that convex and concave portions are formed by the concave and convex portions of the substrate.

Therefore, an uneven pattern capable of stabilizing the floating of the head, approaching the head as close to the magnetic layer as possible, and preventing signal interference between adjacent tracks is needed.

In order to manufacture such a fine uneven pattern on the surface of the non-magnetic substrate, generally, a Ni alloy stamper having a predetermined pattern formed on, for example, a Ni alloy substrate by precision machining is used. The Ni alloy stamper is characterized in that it can accurately transfer a fine uneven pattern, and the stamper is hardly abraded or damaged even when it is used to manufacture many non-magnetic substrates for a long time.

However, although the Ni alloy stamper has a long life span, it is expensive. Since the Ni alloy stamper has a long life span, it can process a large number of substrates (several thousands to tens of thousands of substrates). However, during the stamping process, when a stamping apparatus performs stamping in an atmosphere including dust or powder, the dust or powder is transferred to the substrate, which results in a defective pattern. If an observer does not check that a defective pattern occurs due to, for example, dust or powder during inspection, defects may occur in several thousands to tens of thousands of substrates until the Ni alloy stamper is replaced.

In the semiconductor field, it is very difficult to manufacture a large stamper corresponding to a large wafer that has been mainly used for a semiconductor device with a Ni alloy that has come into widespread use for an imprint stamper, in terms of productivity or manufacturing costs.

In order to solve the above-mentioned problems, the inventors considered using a resin stamper to form an uneven pattern on a magnetic recording medium, instead of the Ni alloy stamper. It is considered that the resin stamper has a shorter life span than the Ni alloy stamper, but is considerably cheaper than the Ni alloy stamper. According to the resin stamper, even when defects occur in the pattern due to dust or powder during a stamping process, it is possible to reduce the number of defective magnetic recording media manufactured since the resin stamper has a short life span and is replaced more frequently than the Ni alloy stamper.

The present invention has been made in order to solve the above problems, and an object of the present invention is to provide a method of manufacturing a resin stamper at a low cost without using a stamper including a Ni alloy substrate. The resin stamper is cheaper than the Ni alloy stamper, but has a shorter life span than the Ni alloy stamper. Therefore, the resin stamper is replaced more frequently than the Ni alloy stamper, which makes it possible to reduce the number of defective products manufactured. As a result, it is possible to reduce the number of defective products, such as magnetic recording media to which a pattern is transferred.

Another object of the present invention is to provide an apparatus capable of manufacturing a resin stamper at a low cost.

Means for Solving the Problems

In order to achieve the objects, the present invention has the following structure:

a method of manufacturing a resin stamper including the steps of:

pressing a resin base material against a mother stamper having a pattern formed on the surface thereof to transfer the pattern of the mother stamper to the surface of the base material by compression molding; and punching the base material.

According to a first aspect of the present invention, a method of manufacturing a resin stamper includes the steps of: (1) providing at least one curing resin layer on a resin base material to form a composite base material, and pressing the curing resin layer of the composite base material against a mother stamper having a pattern formed on the surface thereof to transfer the pattern of the mother stamper to the surface of the composite base material by compression molding; (2) radiating active energy beams to the composite base material or heating the composite base material to cure a portion of the base material; and (3) punching the base material and/or the composite base material.

According to a second aspect of the present invention, in the method of manufacturing a resin stamper according to the above-mentioned aspect, preferably, the curing resin is an active energy beam-curable resin, and the step (2) is radiating the active energy beams to cure a portion of the composite base material.

According to a third aspect of the present invention, in the method of manufacturing a resin stamper according to the first or second aspect, preferably, in the step (3), the base material or the composite base material is punched so that a punched portion is formed inside the pattern formed portion.

According to a fourth aspect of the present invention, in the method of manufacturing a resin stamper according to the first or second aspect, preferably, in the step (3), the composite base material is punched so that a punched portion is formed inside the pattern formed portion and a circumferential portion is formed outside the pattern formed portion.

According to a fifth aspect of the present invention, in the method of manufacturing a resin stamper according to any one of the first to fourth aspects, preferably, the base material is a cured film or sheet of a thermoplastic resin or a thermosetting resin having a glass transition temperature (Tg) that is higher than the temperature of a base material during compression molding.

According to a sixth aspect of the present invention, in the method of manufacturing a resin stamper according to the fifth aspect, preferably, the base material is obtained by applying or printing the curing resin as a liquid on the cured film or sheet of the thermoplastic resin or the thermosetting resin.

According to a seventh aspect of the present invention, in the method of manufacturing a resin stamper according to the fifth aspect, preferably, a film or sheet that transmits 20% or more of ultraviolet rays in the wavelength range of 200 nm to 400 nm is used as the cured film or sheet of the thermoplastic resin or the thermosetting resin.

According to an eighth aspect of the present invention, in the method of manufacturing a resin stamper according to any one of the first to seventh aspects, preferably, at least one resin selected from a (meth)acryloyl group, an oxetanyl group, a cyclohexene oxide group, and a vinyl ether group is used as the curing resin.

According to a ninth aspect of the present invention, in the method of manufacturing a resin stamper according to any one of the first to eighth aspects, preferably, after being cured, the curing resin layer transmits 20% or more of ultraviolet rays in the wavelength range of 200 nm to 400 nm.

According to a tenth aspect of the present invention, in the method of manufacturing a resin stamper according to any one of the fifth to seventh aspects, preferably, a film or sheet having 3% or more of tensile elongation and a tensile modulus of 1.3 GPa or more at a temperature of 25° C. is used as the cured film or sheet of the thermoplastic resin or the thermosetting resin.

According to an eleventh aspect of the present invention, in the method of manufacturing a resin stamper according to any one of the sixth to tenth aspects, preferably, a step of applying or printing the curing resin as a liquid on the cured film or sheet of the thermoplastic resin to obtain a composite base material, a step of pressing the composite base material against the mother stamper to transfer the pattern of the mother stamper to the composite base material by compression molding, a step of radiating the active energy beams to cure a portion of the composite base material, and a step of punching the composite base material while or after the composite base material is cured are continuously performed in this order.

According to a twelfth aspect of the present invention, in the method of manufacturing a resin stamper according to the eleventh aspect, preferably, the film or sheet of the thermoplastic resin or the thermosetting resin is a polyethylene terephthalate film that has one surface subjected to an adhesion process and has a thickness in the range of 5 to 188 µm.

According to a thirteenth aspect of the present invention, in the method of manufacturing a resin stamper according to the eleventh or twelfth aspect, preferably, the mother stamper is formed of glass, quartz, or electroformed nickel.

According to a fourteenth aspect of the present invention, in the method of manufacturing a resin stamper according to the thirteenth aspect, preferably, the mother stamper is formed of electroformed nickel, and the active energy beams are radiated from the opposite side of the mother stamper to cure a portion of the composite base material.

According to a fifteenth aspect of the present invention, in the method of manufacturing a resin stamper according to any one of the eleventh to fourteenth aspects, preferably, the active energy beams are ultraviolet rays in the wavelength range of 200 nm to 400 nm.

According to a sixteenth aspect of the present invention, in the method of manufacturing a resin stamper according to the third aspect, preferably, after the base material or the composite base material is punched so that the punched portion is formed inside the pattern formed portion, a step (1) of using the punched portion to align the mother stamper with the base material or the composite base material, and pressing the composite base material against the mother stamper by compression molding to transfer the pattern of the mother stamper to the composite base material, and a step (2) of curing a portion of the composite base material are performed.

According to a seventeenth aspect of the present invention, in the method of manufacturing a resin stamper according to the sixteenth aspect, preferably, the base material is a composite base material obtained by applying or printing a curing resin as a liquid on a cured film or sheet of a thermoplastic resin or a thermosetting resin having a glass transition temperature (Tg) that is higher than the temperature of a base material during compression molding.

According to an eighteenth aspect of the present invention, in the method of manufacturing a resin stamper according to the seventeenth aspect, preferably, a step of applying or printing the curing resin as a liquid on the cured film or sheet of the thermoplastic resin or the thermosetting resin to obtain a composite base material, a step of punching the composite base material so that a punched portion is formed inside the pattern formed portion, a step of using the punched portion to align the mother stamper with the composite base material and pressing the composite base material against the mother stamper by compression molding to transfer the pattern of the mother stamper to the composite base material, and a step of curing a portion of the composite base material are continuously performed in this order.

According to a nineteenth aspect of the present invention, there is provided an apparatus that presses a composite base material including at least one curing resin layer against a mother stamper having a pattern formed on the surface thereof by compression molding to transfer the pattern of the mother stamper to the composite base material, and punches the composite base material, thereby manufacturing a resin stamper. The apparatus includes: a cutter member that is movable relative to the mother stamper; a radiating device that is provided in the vicinity of the cutter member and radiates light to a side opposite to the cutter member; and a translucent pressing base that is provided in the vicinity of the cutter member. The composite base material is inserted between the mother stamper and the cutter member, and the composite base material arranged between the cutter member and the mother stamper is interposed between the translucent pressing base and the mother stamper. A predetermined pattern of the mother stamper is transferred to the composite base material, and the radiating device radiates light to the composite base material to cure the curing resin layer. The cutter member punches the composite base material before or after the curing resin layer is cured, or at the same time when the curing resin layer is cured.

According to a twentieth aspect of the present invention, in the apparatus for manufacturing a resin stamper according to the nineteenth aspect, preferably, the radiating device is a UV radiating device of a continuous pulse emission type.

According to a twenty-first aspect of the present invention, in the apparatus for manufacturing a resin stamper according to the twentieth aspect, preferably, the UV radiating device of a continuous pulse emission type is a quartz xenon lamp.

According to a twenty-second aspect of the present invention, in the apparatus for manufacturing a resin stamper according to the nineteenth aspect, preferably, the radiating device is an LED lamp that emits light in the wavelength range of 360 to 370 nm.

According to a twenty-third aspect of the present invention, there is provided an apparatus that presses a composite base material including at least one curing resin layer against a mother stamper having a pattern formed on the surface thereof by compression molding to transfer the pattern of the mother stamper to the composite base material, and punches the composite base material, thereby manufacturing a resin stamper. The apparatus includes: a cutter member that is movable relative to the mother stamper; a heating member that is provided in the vicinity of the cutter member; and a pressing base that is provided between the outer circumferential cutter portion and the inner circumferential cutter portion. The composite base material is inserted between the mother stamper and the cutter member, and the composite base material arranged between the cutter member and the mother stamper is interposed between the pressing base and the mother stamper. A predetermined pattern of the mother stamper is transferred to the composite base material, and the heating member generates heat to cure the curing resin layer. The cutter member punches the composite base material before or after the curing resin layer is cured, or at the same time as when the curing resin layer is cured.

According to a twenty-fourth aspect of the present invention, in the apparatus for manufacturing a resin stamper according to any one of the nineteenth to twenty-third aspects, preferably, the cutter member includes an inner circumferential cutter portion having an inner circumferential cutter blade that punches the center of the resin composite base material.

According to a twenty-fifth aspect of the present invention, in the apparatus for manufacturing a resin stamper according to any one of the nineteenth to twenty-third aspects, preferably, the cutter member includes an outer circumferential cutter portion having an outer circumferential cutter blade and an inner circumferential cutter portion having an inner circumferential cutter blade that is provided inside of the outer circumferential cutter portion.

According to a twenty-sixth aspect of the present invention, in the apparatus for manufacturing a resin stamper according to any one of the nineteenth to twenty-fifth aspects, preferably, a sliding support member that positions the mother stamper and guides the cutter blade punching the composite base material is provided around the mother stamper.

According to a twenty-seventh aspect of the present invention, there is provided a method of imprinting the pattern of the resin stamper fabricated by the manufacturing method according to any one of the first to ninth aspects on a thin film formed on a base, or a thin film formed on a base with a mask layer interposed therebetween.

According to a twenty-eighth aspect of the present invention, in the imprint method according to the twenty-seventh aspect, preferably, the resin stamper is used to perform imprinting at a pressure of 60 MPa or less.

According to a twenty-ninth aspect of the present invention, in the imprint method according to the twenty-seventh or twenty-eighth aspect, preferably, the thickness of the thin film is in the range of 50 to 500 nm before the imprinting.

According to a thirtieth aspect of the present invention, in the imprint method according to any one of the twenty-seventh to twenty-ninth aspects, preferably, the thin film is formed of a curing resin including at least one of an aromatic compound, an alicyclic compound, and a silicon compound.

According to a thirty-first aspect of the present invention, in the imprint method according to any one of the twenty-seventh to twenty-ninth aspects, preferably, a magnetic recording medium having a magnetic film formed on a base is used as the base, and a pattern formed on the thin film is used to remove a portion of the magnetic film or make a portion of the magnetic film non-magnetic.

According to a thirty-second aspect of the present invention, a magnetic recording medium is manufactured by the method according to the thirty-first aspect.

According to a thirty-third aspect of the present invention, a magnetic recording/reproducing apparatus includes the magnetic recording medium according to the thirty-second aspect.

The present invention also includes the following structure.

According to a thirty-fourth aspect of the present invention, a method of manufacturing a plate-shaped resin stamper includes the steps of: pressing a resin base material against a mother stamper having a pattern formed on the surface thereof to transfer the pattern of the mother stamper to the base material by compression molding; and punching the base material. The resin base material has a multi-layer structure including at least a front layer and a base layer. The front layer is formed of a thermoplastic resin that has a tensile modulus of 1.5 GPa or more at a temperature of 25° C. and a glass transition temperature of 40° C. or more, and the base layer is formed of a low-elasticity resin that has a tensile modulus of 1.0 GPa or less at a temperature of 25° C. During the compression molding, when the glass transition temperature of the resin forming the front layer is $Tg_A$, the front layer is pressed against the mother stamper at a temperature of $(Tg_A-10)°$ C. or more.

According to a thirty-fifth aspect of the present invention, in the method of manufacturing a resin stamper according to the thirty-fourth aspect, preferably, the resin base material further includes a rear layer, in addition to the base layer and the front layer, and the rear layer is formed of a thermoplastic resin or a thermosetting resin that has a tensile modulus of 1.5 GPa or more at a temperature of 25° C. and a glass transition temperature of 40° C. or more.

According to a thirty-sixth aspect of the present invention, in the method of manufacturing a resin stamper according to the thirty-fifth aspect, preferably, the rear layer is formed of a resin having a tensile modulus and a glass transition temperature that are greater than those of the resin forming the front layer.

According to a thirty-seventh aspect of the present invention, in the method of manufacturing a resin stamper according to the thirty-sixth aspect, preferably, during the compression molding, when the glass transition temperature of the resin forming the front layer is $Tg_A$ and the glass transition temperature of the rear layer is $Tg_C$, the rear layer is formed at a temperature that is higher than $(Tg_A-10)°$ C. and lower than $Tg_C$.

According to a thirty-eighth aspect of the present invention, in the method of manufacturing a resin stamper, preferably, when the base material is punched to obtain a resin stamper, at least one of an inner portion and an outer portion of the base material is punched to correspond to a desired plane shape of the resin stamper.

According to a thirty-ninth aspect of the present invention, in the method of manufacturing a resin stamper, preferably, a film or sheet that transmits 20% or more of ultraviolet rays in the wavelength range of 200 nm to 400 nm is used as the resin base material.

According to a fortieth aspect of the present invention, an imprint method includes the steps of: forming a thin active energy beam-curable resin film on a base or a substrate; and pressing the resin stamper manufactured by the manufacturing method according to any one of the thirty-fourth to thirty-ninth aspects against the thin film.

According to a forty-first aspect of the present invention, in the imprint method according to the fortieth aspect, preferably, the stamper is pressed at a pressure in the range of 0.01 to 60 MPa.

According to a forty-second aspect of the present invention, in the imprint method according to the fortieth or forty-first aspect, preferably, the thickness of the thin active energy beam-curable resin film is in the range of 20 nm to 500 nm.

According to a forty-third aspect of the present invention, in the imprint method according to any one of the fortieth to forty-second aspect, preferably, the thin active energy beam-curable resin film includes at least one of an aromatic compound, an alicyclic compound, and a silicon compound.

According to a forty-fourth aspect of the present invention, there is provided a method of manufacturing a magnetic recording medium having a fine pattern formed thereon. The method includes the step of: removing a portion of a magnetic film from a fine pattern surface that is formed by the method according to any one of the fortieth to forty-third aspects, or making a portion of the magnetic film non-magnetic.

According to a forty-fifth aspect of the present invention, a magnetic recording medium is manufactured by the method according to the forty-fourth aspect.

According to a forty-sixth aspect of the present invention, a magnetic recording/reproducing apparatus includes the magnetic recording medium according to the forty-fifth aspect.

Advantages of the Invention

According to the present invention, it is possible to transfer the pattern of the mother stamper to the resin composite base material, and thus manufacture a resin stamper with a pattern at a low cost. The resin stamper is used to form a pattern on a thin film of, for example, a magnetic recording medium by an imprint method, and the pattern formed on the thin film is used to remove a pattern from a portion of the magnetic film or make a portion of the magnetic film non-magnetic according to the pattern. In this way, it is possible to form a pattern on the magnetic film. The use of the resin stamper makes it possible to implement an imprint method at a lower cost than a precise metal stamper used in the imprint method according to the related art, such as a Ni alloy stamper manufactured by electroforming. Therefore, it is possible to form a pattern on the magnetic film of the magnetic recording medium at a low cost.

The resin stamper is cheaper than that of a precise metal stamper, such as a Ni alloy stamper manufactured by electroforming. Therefore, when the resin stamper is used to form a pattern on a thin film of a magnetic recording medium, it is possible to easily replace the resin stamper at a low cost even when the resin stamper is replaced more frequently than the Ni alloy stamper due to dust adhesion. Therefore, even when the resin stamper is replaced more frequently than the Ni alloy stamper, the manufacturing costs are less likely to increase. For example, when magnetic recording media are manufactured while frequently replacing the resin stampers, it is possible to reduce the number of defective products manufactured, even when defects occur due to dust adhesion during manufacture, as compared to the case in which a metal stamper, such as a Ni alloy stamper, is used to manufacture a large number of magnetic recording media.

According to the present invention, both a pattern transfer process and a process of punching the base material using the cutter member are performed. Therefore, it is possible to easily obtain a resin stamper having a desired shape and a desired pattern transferred thereto. In the pattern transfer process, the mother stamper is pressed against a resin composite base material to transfer the pattern of the mother stamper to the resin composite base material by compression molding, and the curing resin is cured by active energy beams or heat, thereby transferring a pattern. As a result, it is possible to accurately transfer a fine pattern, and thus obtain a resin stamper having a desired fine pattern formed thereon.

In the present invention, a film or sheet that transmits 20% or more of ultraviolet rays in the wavelength range of 200 nm to 400 nm is used, and a curing resin layer having a curing functional group is formed thereon. Therefore, it is possible to sufficiently radiate active energy beams to the curing resin without hindering the active energy beams from reaching the curing resin. As a result, it is possible to reliably cure the curing resin layer, and thus reliably transfer a fine pattern.

According to the apparatus for manufacturing a resin stamper of the present invention, it is possible to transfer the pattern of a mother stamper to a resin composite base material, and punch the resin base material or composite base material into a desired shape. As a result, it is possible to manufacture a resin stamper having a desired shape and a desired pattern.

In the manufacturing apparatus according to the present invention, the cutter member includes an inner circumferential cutter blade or an outer circumferential cutter blade. According to this structure, it is possible to punch the inside or outside of the pattern of the base material to manufacture a resin stamper having a desired shape.

A sliding support member is provided around the mother stamper to guide the inner circumferential cutter blade or the outer circumferential cutter blade for punching the base material. According to this structure, it is possible to improve punching accuracy, such as a punching position or a punching shape.

The resin stamper is used to transfer a pattern to a thin film on a base by an imprint method. In this way, it is possible to accurately transfer a pattern.

The imprint process is performed at a pressure of 60 MPa or less. According to this structure, it is possible to accurately transfer a pattern. In addition, when the thickness of a curing resin film is in the range of 50 to 500 nm, it is possible to accurately transfer a pattern using an imprint method.

The resin stamper is used to transfer a pattern to a thin film of a magnetic recording medium having a magnetic layer on a base by an imprint method. In this way, it is possible to accurately transfer a pattern to the thin film on the base. The pattern is used to remove a portion of the magnetic film, or make a portion of the magnetic film non-magnetic. Therefore, it is possible to discriminate a region in which magnetic recording can be performed in the magnetic layer of the magnetic recording medium from a region in which magnetic recording cannot be performed according to the pattern. When a pattern for dividing magnetic recording tracks is used as an example of a pattern to be formed, it is possible to obtain a discrete track magnetic recording medium having an accurate track pattern formed thereon.

According to another aspect of the present invention, a base material is formed in a multi-layer structure of a front layer having a desired tensile modulus and a base layer having a desired tensile modulus. According to this structure, it is possible to obtain a resin stamper having a high pattern transfer ratio and capable of accurately transferring a fine pattern. That is, when the resin stamper is used to imprint a pattern on an active energy-beam curable resin film formed on a base or substrate, a low-elasticity base layer makes it possible to follow little distortion of a base material or a substrate. In addition, since a fine pattern is foamed on a high elastic modulus front layer, the base material is less likely to be deformed, and it is possible to perform imprint with high accuracy.

Further, in the present invention, when the mother stamper is pressed against the resin base material to transfer the pattern of the mother stamper to the resin base material, heat is applied to soften the resin base material, and then the pattern is transferred to the resin base material. Therefore, it is possible to accurately transfer a fine pattern, and thus obtain a resin stamper having a desired fine pattern. In addition, since a pattern is transferred at a temperature that is expressed by the formula of (the glass transition temperature of the front layer—10° C.) or more, it is possible to obtain an accurate transfer pattern.

The term 'substrate' means a base, such as a glass plate, with a layer, such as a magnetic film and/or a protective film, on which a pattern will be formed.

The resin stamper is used to transfer a pattern to a thin film on a base or substrate by an imprint method. Therefore, it is possible to accurately transfer a pattern.

The imprint process is performed at a pressure in the range of 0.01 to 60 MPa. According to this structure, it is possible to accurately transfer a pattern. When the thickness of the curing resin film is in the range of 20 to 500 nm, it is possible to accurately transfer a pattern using an imprint method.

The resin stamper is used to transfer a pattern to a thin film on a substrate including a magnetic layer by an imprint method. In this way, it is possible to accurately transfer a pattern to the thin film. The pattern is used to remove a portion of the magnetic film, or make a portion of the magnetic film non-magnetic. Therefore, it is possible to discriminate a region in which magnetic recording can be performed in the magnetic layer of the magnetic recording medium from a region in which magnetic recording cannot be performed, according to the pattern. When a pattern for dividing magnetic recording tracks is used as an example of a pattern to be formed, it is possible to obtain a discrete track magnetic recording medium having an accurate track pattern formed thereon.

BEST MODE FOR CARRYING OUT THE INVENTION

First Embodiment

Hereinafter, exemplary embodiments of the present invention will be described with reference to the accompanying drawings, but the present invention is not limited to the following embodiments.

Figure 1:
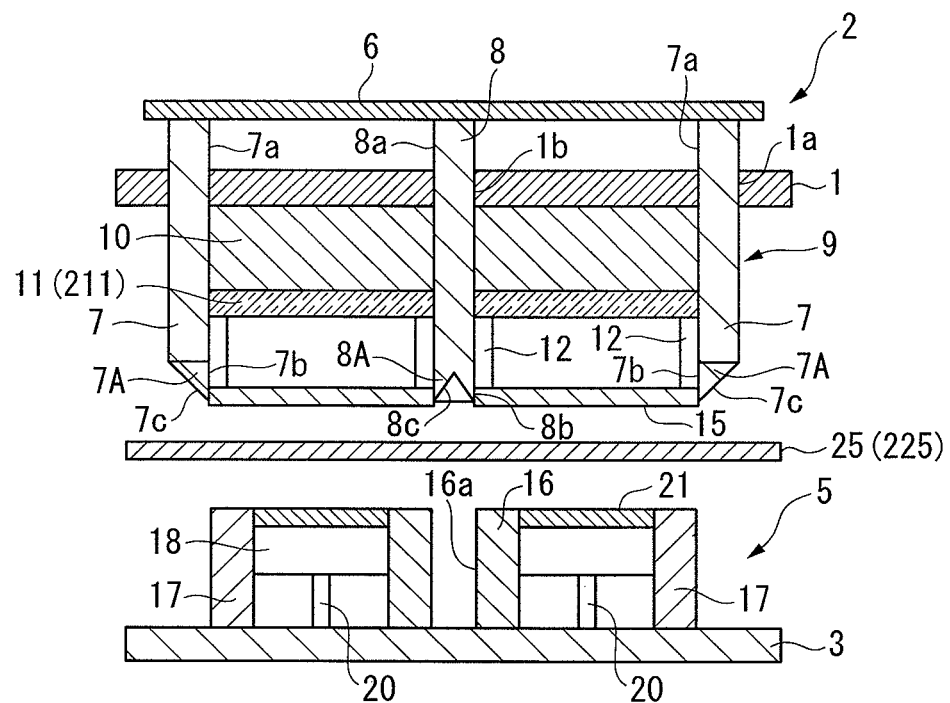
FIG. 1 is a cross-sectional view illustrating an apparatus for manufacturing a resin stamper according to a first embodiment of the present invention.

FIGS. 1 to 9 are diagrams illustrating an apparatus for manufacturing a resin stamper according to a first embodiment of the present invention. As shown in FIG. 1, the manufacturing apparatus includes an upper set 2 supported by a first mounting plate 1 and a lower set 5 supported by a second mounting plate 3. The first mounting plate 1 is supported by an actuator for movement in the vertical direction, such as a hydraulic cylinder (not shown) so as to be movable in the vertical direction, and the second mounting plate 3 is fixed to a base (not shown).

In this embodiment, the structure of an apparatus for manufacturing a doughnut disk-shaped resin stamper will be described below. The shape of the resin stamper is not limited to the doughnut disk shape, but the resin stamper may have various shapes by changing the shape of a cutter member of the manufacturing apparatus. The manufacture of resin stampers having shapes other than the doughnut shape will be described later.

A disk-shaped cutter set member 6 is provided above the first mounting plate 1 and is supported by an actuator for movement in the vertical direction, such as a hydraulic cylinder, so as to be movable in the vertical direction. A cylindrical outer circumferential cutter portion 7 is provided in an outer circumferential portion of the bottom of the cutter set member 6, and an inner circumferential cutter portion 8 having a round bar shape is provided at the center of the bottom of the cutter set member 6. The outer circumferential cutter portion 7 and the inner circumferential cutter portion 8 form a cutter member 9. In addition, a ring-shaped outer circumferential cutter blade 7A is formed at the leading end of the outer circumferential cutter portion 7 so as to face downward, and an inner circumferential cutter blade 8A is formed at the leading end of the inner circumferential cutter portion 8.

The outer circumferential cutter portion 7 extends to the lower side of the lower surface of the mounting plate 1 through a clearance hole 1a that is formed in the outer circumferential portion of the mounting plate 1. The inner circumferential cutter portion 8 extends to the lower side of the mounting plate 1 through a clearance hole 1b that is formed at the center of the mounting plate 1. When the cutter set member 6 is moved in the vertical direction relative to the mounting plate 1, the outer circumferential cutter portion 7 and the inner circumferential cutter portion 8 are moved in the vertical direction.

The outer circumferential cutter blade 7A has a triangular shape in a cross-sectional view, and includes a cutting surface 7b that extends from an inner circumferential surface 7a of the cylindrical outer circumferential cutter portion 7, and an outside cutting surface 7c that is inclined toward the outside of the outer circumferential cutter portion 7. The inner circumferential cutter blade 8A includes a cutting surface 8b that extends from the outer circumferential surface of the round-bar-shaped inner circumferential cutter portion 8, and a mortar-shaped concave portion 8c having an inverted-V shape that is formed at the leading end of the inner circumferential cutter portion 8.

Below the mounting plate 1, a light source support mechanism 10 and a radiating device 11 are provided between the outer circumferential cutter portion 7 and the inner circumferential cutter portion 8. The radiating device 11 can radiate the following active energy beams. The active energy beams include, for example, light beams (optical energy), such as ultraviolet rays, and radioactive rays, such as electron beams, X-rays, α-rays, β-rays, γ-rays, and neutron rays. Particularly, it is preferable to use ultraviolet rays in the wavelength range of 200 nm to 400 nm, since there are various types of light sources using ultraviolet rays.

Ultraviolet light sources include a metal halide lamp, a high-pressure mercury lamp, a low-pressure lamp, an LED lamp, and a xenon lamp. In this case, since a resin stamper is manufactured, it is preferable that the temperature of the resin stamper not increase during ultraviolet curing, and it is also preferable to use an LED lamp that does not include an active energy beam having a long wavelength or a quartz xenon lamp that emits continuous pulse light.

A frame-shaped support member 12 is provided below the radiating device 11, and a translucent pressing base 15, such as a disk-shaped glass plate, is provided below the support member 12. The light source support member 10, the radiating device 11, the support member 12, and the translucent pressing base 15 are integrally formed on the mounting plate 1. Therefore, when the first mounting plate 1 is moved in the vertical direction, the translucent pressing base 15 is also moved in the vertical direction.

A cylindrical inside sliding support member 16 and a cylindrical outside sliding support member 17 having the same height are provided on the second mounting plate 3, and a disk-shaped table 18 is interposed therebetween so as to be slidable in the vertical direction. The table 18 is supported by an elastic member 20, such as a spring member, provided below the table. A doughnut disk-shaped mother stamper 21 is provided on the table 18 so as to slightly protrude from the sliding support members 16 and 17.

The mother stamper 21 has a transfer pattern formed on the upper surface thereof. In this embodiment of the present invention, since a resin stamper for forming an uneven pattern on the surface of a discrete track magnetic recording medium is manufactured, the mother stamper 21 has an uneven pattern to be transferred onto the surface of the discrete track magnetic recording medium formed on its upper surface.

A concave portion 16a into which the rod-shaped inner circumferential cutter blade 8A can be inserted is formed at the center of the inside support member 16.

In order to manufacture a resin stamper using the manufacturing apparatus shown in FIG. 1, a composite base material obtained by forming at least one curing resin layer on a sheet-shaped base, which is the base of a resin stamper, is prepared.

Figure 5:
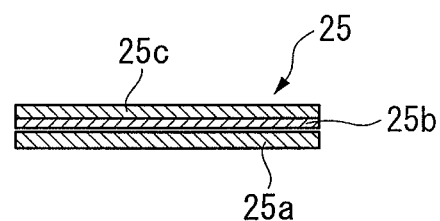
FIG. 5 is a cross-sectional view illustrating a resin base material punched by the manufacturing apparatus according to the first embodiment.

As an example of the composite base material, a three-layer sheet-shaped composite base material 25 shown in FIG. 5 may be used. In this embodiment, the composite base material 25 includes a thin hard layer (base layer) 25a, a soft resin layer 25b, and a curable resin layer 25c.

It is preferable that the hard layer (base layer) 25a be formed of a material that has a high ultraviolet transmittance and is hardly deformed during a punching process. For example, the hard layer is formed of aromatic polyester, such as polyethylene terephthalate or polyethylene naphthalate, cycloolefin polymer, such as ZEONOR (trade name, manufactured by Zeon Corporation), TOPAS (trade name, manufactured by Polyplastics Co., Ltd.), ARTON (trade name, manufactured by JSR Corporation), or APEL (trade name, manufactured by Mitsui Chemicals Inc.), rigid thermoplastic resin, such as aromatic polycarbonate or alicyclic polyimide, polyolefin-based thermoplastic resin, such as polypropylene, poly-4-methylpentene, polystyrene, or PMMA, or a thermosetting resin material, such as epoxy resin or allyl resin. The thickness of the hard layer 25a may be in the range of about 10 to 3000 μm.

It is preferable that the soft resin layer 25b be formed of a material that has a high ultraviolet transmittance and sufficient flexibility to follow the waviness of a base material that is imprinted by the resin stamper according to the present invention. For example, the soft resin layer is formed of a resin material, such as silicon rubber, urethane rubber, or polypropylene. The thickness of the soft adhesive layer 25b is preferably in the range of about 10 to 1000 μm.

In the three-layer sheet-shaped composite base material 25, when the waviness of the hard layer 25a is small, the soft resin layer 25b may be omitted, and a two-layer base material of the hard layer 25a and the resin layer 25c may be used.

The curing resin layer 25c is composed of at least one kind of resins which have curable groups such as a (meth)acryloyl group, an allyl group, a vinyl group, an oxetanyl group, a glycidyl group, a cyclohexene oxide group, or a vinylether group, and it is particularly preferably composed of resins having groups with a high curing rate by active energy beams, such as a (meth)acryloyl group, an oxetanyl group, a cyclohexene oxide group, or a vinylethyl group.

Examples of the resin having a (meth)acryloyl group, which can be used herein, include:

mono(meth)acrylates such as methyl(meth)acrylate, ethyl (meth)acrylate, n-propyl(meth)acrylate, isopropyl(meth) acrylate, n-butyl(meth)acrylate, isobutyl(meth)acrylate, sec-butyl(meth)acrylate, hexyl(meth)acrylate, octyl(meth) acrylate, 2-ethylhexyl(meth)acrylate, decyl(meth)acrylate, isobornyl(meth)acrylate, cyclohexyl(meth)acrylate, phenyl (meth)acrylate, benzyl(meth)acrylate, 2-hydroxyethyl(meth) acrylate, 2-hydroxypropyl(meth)acrylate, 3-hydroxypropyl (meth)acrylate, 2-hydroxybutyl(meth)acrylate, or 2-hydroxyphenylethyl(meth)acrylate;

(meth)acrylamides such as N,N-dimethyl(meth)acrylamide, N,N-diethyl(meth)acrylamide, or N-acryloylmorpholine;

polyfunctional(meth)acrylates such as ethyleneglycol di(meth)acrylate, propyleneglycol di(meth)acrylate, 1,4-butanediol di(meth)acrylate, diethyleneglycol di(meth)acrylate, triethyleneglycol di(meth)acrylate, trimethylolpropane di(meth)acrylate, trimethylolpropane tri(meth)acrylate, or pentaerythritol penta(meth)acrylate;

epoxy(meth)acrylates, which are compounds obtained by adding (meth)acrylate to epoxy resins, such as a bisphenol A epoxy resin, a hydrogenated bisphenol A epoxy resin, a bromo bisphenol A epoxy resin, a bisphenol F epoxy resin, a novolac epoxy resin, a phenol-novolac epoxy resin, a cresol-novolac epoxy resin, an alicyclic epoxy resin, an N-glycidyl epoxy resin, a novolac bisphenol A epoxy resin, a chelated epoxy resin, a glyoxal epoxy resin, an amino group-containing epoxy resin, a rubber-modified epoxy resin, a dicyclopentadiene phenolic epoxy resin, a silicone-modified epoxy resin, or a ε-caprolactone-modified epoxy resin; and the like.

Examples of the resin having an allyl group include:

allyl ethers such as ethyleneglycol monoallyl ether or allylglycidyl ether;

monoallyl esters such as allyl acetate or allyl benzoate;

diallylamine, diallyl esters such as 1,4-cyclohexane diallyldicarbonate, diallyl phthalate, diallyl terepthalate, or diallyl isopthalate;

allyl ester resins, which are obtained by reacting oligoesters such as oligopropylene terepthalate with allyl alcohol; and the like.

Examples of the resin having a vinyl group include:

monovinyl ethers such as n-propylvinylether, isopropylvinylether, n-butylvinylether, isobutylvinylether, 2-ethylhexylvinylether, octadecylvinylether, or cyclohexylvinylether;

monovinyl esters such as vinyl acetate, vinyl propionate, vinyl butyrate, or vinyl benzoate;

divinyl esters such as divinyl adipate;

N-vinyl amides such as N-vinylpyrrolidone or N-methyl-N-vinylacetamide;

styrene derivatives such as styrene, 2,4-dimethyl-α-methylstyrene, o-methylstyrene, m-methylstyrene, p-methylstyrene, 2,4-dimethylstyrene, 2,5-dimethylstyrene, 2,6-dimethylstyrene, 3,4-dimethylstyrene, 3,5-dimethylstyrene, 2,4,6-trimethylstyrene, 2,4,5-trimethylstyrene, pentamethylstyrene, o-ethylstyrene, m-ethylstyrene, p-ethylstyrene, o-chlorostyrene, m-chlorostyrene, p-chlorostyrene, o-bromostyrene, m-bromostyrene, p-bromostyrene, o-methoxystyrene, m-methoxystyrene, p-methoxystyrene, o-hydroxystyrene, m-hydroxystyrene, p-hydroxystyrene, 2-vinylbiphenyl, 3-vinylbiphenyl, 4-vinylbiphenyl, 1-vinylnaphthalene, 2-vinylnaphthalene, 4-vinyl-p-terphenyl, 1-vinylanthracene, α-methylstyrene, o-isopropenyltoluene, m-isopropenyltoluene, p-isopropenyltoluene, 2,4-dimethyl-α-methylstyrene, 2,3-dimethyl-α-methylstyrene, 3,5-dimethyl-α-methylstyrene, p-isopropyl-α-methylstyrene, α-ethylstyrene, or α-chlorostyrene;

divinyl ethers such as ethyleneglycol divinyl ether, 1,4-butanedioldivinylether, 1,6-hexanedioldivinylether, 1,9-nonanedioldivinylether, cyclohexane dimethanol divinyl ether, diethyleneglycol divinyl ether, or triethyleneglycol divinyl ether;

polyfunctional vinyl ethers such as trimethylolpropane trivinyl ether or pentaerythritol tetravinylether;

divinyl aryls such as divinyl benzene or divinylphenyl; and the like.

Examples of the resin having an oxetanyl group include:
mono-oxetanyl compounds such as 3-ethyl-3-hydroxymethyl oxetane or 3-ethyl-3-methacryloxymethyloxetane;
polyfunctional oxetane resins such as Aronoxetane OXT-121 (trade name) and OX-SQ (trade name) manufactured by Toagosei Co., Ltd, or OXTP (trade name) and OXBP (trade name) manufactured by Nippon Steel Chemical Co., Ltd.

Examples of the resin having a glycidyl group include:
a bisphenol A epoxy resin, a hydrogenated bisphenol A epoxy resin, a brominated bisphenol-A epoxy resin, a bisphenol F epoxy resin, a novolac epoxy resin, a phenol-novolac epoxy resin, a cresol-novolac epoxy resin, an N-glycidyl epoxy resin, a novolac bisphenol A epoxy resin, a chelated epoxy resin, a glyoxal epoxy resin, an amino group-containing epoxy resin, a rubber-modified epoxy resin, a dicyclopentadiene phenolic epoxy resin, a silicone-modified epoxy resin, or a ε-caprolactone-modified epoxy resin; and the like.

Examples of the resin having a cyclohexene oxide group include Celloxide 2021P (trade name), Celloxide 3000 (trade name), EHPE 3150 (trade name), and EHPE 3150CE (trade name) manufactured by Daicel Chemical Industries, Ltd.

It is preferable that the thickness of the light curable resin layer $25c$ be in the range of about 0.05 to 50 μm and it transmit 20% or more of ultraviolet rays in the wavelength range of 400 nm or less.

The following is given as a second example of the composite base material: a composite base material obtained by applying or printing a curing resin as a liquid on a portion of or the entire surface of a cured film or sheet of a thermoplastic resin or a thermosetting resin.

The film or sheet may be formed of a material that has high palanarizing characteristics and transmits 20% or more of active energy beams. Specifically, the film or sheet may be formed of the same material as that forming the hard layer $25a$, and it is preferable that the film or sheet be formed of polyethylene terephthalate in order to improve planarizing characteristics, strength, and heat resistance. In addition, it is preferable that the film or sheet be formed of cycloolefin polymer in order to improve the transmittance of active energy beams.

It is preferable to perform an adhesion process on the surface onto which a liquid curing resin is applied, and examples of the adhesion process include a process of applying an adhesive resin, a plasma process, and a corona discharge process. However, it is more preferable to use the process of applying an adhesive resin.

The thickness of the film or sheet is preferably in the range of about 5 to 1000 μm, more preferably, 10 to 300 μm. When the thickness of the film or sheet is excessively small, the strength thereof is lowered. When the thickness of the film or sheet is excessively large, the transmittance of active energy beams is lowered or flexibility is lowered, which may cause problems in transporting the film.

A film or sheet that is cut in a predetermine shape may be used. It is preferable to use a film or sheet having an elongated shape in order to increase productivity. The elongated film or sheet is restricted in thickness since it is wound on a roll. For example, a PET film with a thickness of 188 μm has been on the market. However, a film with a thickness that is greater than 188 μm may be used.

In addition, holes may be formed at both ends of the film or sheet in order to facilitate the movement of the film or sheet.

As a method of applying or printing a curing resin, any of the following may be used: a printing method using a bar coater; and a screen printing method or a gravure printing method depending on the degree of viscosity. In particular, it is preferable to use the screen printing method or the gravure printing method in consideration of continuous production. The thickness of the coated film is preferably in the range of 0.5 to 50 μm, more preferably, 2 to 30 μm. In addition, it is preferable that the film transmit 20% or more ultraviolet rays in the wavelength range of 400 nm or less. When the thickness of the film is excessively small, it is difficult to form a film with a uniform thickness. When the thickness of the film is excessively large, it takes a long time to cure the film using active energy beams.

It is preferable to apply or print the curing resin to form a film in a continuous strip shape, or it is preferable to intermittently form only portions to be imprinted.

The curing resin is curable by ultraviolet rays, has a functional group, and is used in a solvent-free environment or with being dissolved in a solvent. When the curing resin is dissolved in a solvent, heat is applied to the resin to remove the solvent, and an active energy beam curable nanoimprint technique is performed on the resin.

It is not necessary to perform the applying or printing process immediately before the next process. For example, the applying or printing process may be performed, a cover film may be adhered to the applied surface, and the laminate may be rolled and then used in a punching process.

The curing resin layer $25c$ may be used as the curing resin.

In this case, it is preferable that the following processes be continuously performed: a process of applying or printing the curing resin as a liquid on a cured film or sheet of a thermoplastic resin or a thermosetting resin to form a composite base material; a process of pressing the composite base material against a mother stamper, which will be described below, by compression molding to transfer the pattern of the mother stamper to the composite base material; a process of radiating active energy beams, such as light, onto the composite base material to cure a portion of the composite base material; and a process of punching the composite base material during or after the curing process. It is preferable that the process of radiating light to cure a portion of the composite base material and the process of punching the composite base material during or after the curing process be integrally performed by the same apparatus, in order to improve manufacturing efficiency.

Various examples of the method of performing imprint using the second example of the composite base material will be described below with reference to FIGS. 23A to 24C.

As a third example of the composite base material, the following is given: a composite base material is obtained by applying or printing a curing resin as a liquid on a cured film or sheet of a thermoplastic resin or a thermosetting resin having a glass transition temperature (Tg) that is higher than the temperature of a base during compression molding; and punching is performed on the composite base material before the transfer process (1) so that a punched portion is formed inside a pattern forming portion.

Alternatively, as the third example of the composite base material, the following is given: a composite base material obtained by forming a cured film or sheet of a thermoplastic resin or a thermosetting resin having a glass transition temperature (Tg) that is higher than the temperature of a base during compression molding, punching the cured film so that a punched portion is formed inside a pattern forming portion, and applying or printing a curing resin as a liquid on the film.

When the applying or printing process is performed before the punching process, a curing resin may be applied or printed, a cover film may be adhered to the applied surface, the laminate may be rolled to form a dry film, and the dry film may be punched.

When the applying or printing process is performed after the punching process, a cover film may be adhered to the applied surface, and the laminate may be rolled and supplied to a transfer process. During the applying or printing process, the curing resin may flow out from the punched hole. In this case, it is preferable to remove the curing resin with a solvent, or it is preferable to attach an adhesive film to absorb the curing resin and detach the adhesive film.

According to this method, after punching is performed on the base material to form positioning holes, compression molding and curing processes, which will be described below, are performed on the base material. Therefore, the position accuracy of a pattern is improved and the transfer efficiency of the pattern is improved. As a result, it is possible to obtain a resin stamper having a fine pattern accurately transferred thereto.

In order to perform positioning between the composite base material and the mother stamper using the punched portions formed in the base material or the composite base material, for example, a center pin may be provided in a support hole of the mother stamper, and the mother stamper and the composite base material may be set so that the center pin passes through the center hole of the mother stamper and the punched portion of the base material.

When this method is used, the process of punching the composite base material so that an edge portion is formed other than the pattern forming portion may be omitted, and a film or sheet having a plurality of patterns transferred thereto may be used as the resin stamper.

Various examples of the method of performing imprint using the third example of the composite base material will be described below with reference to FIGS. 25A to 26C.

The sheet-shaped composite base material 25 having the above-mentioned structure is interposed between the mother stamper 21 and the translucent pressing base 15 with the light-curable resin layer 25c facing downward, as shown in FIG. 1. Then, the first mounting plate 1 is moved down so that the translucent pressing base 15 presses the composite base material 25 against the surface of the mother stamper 21 at a predetermined pressure. It is preferable that the pressing pressure be in the range of 0.01 to 60 MPa.

The mother stamper 21 may be composed of a metal plate made of a material, such as a Ni alloy, that enables precision machining and is capable of precisely forming a fine uneven pattern using the current molding technique.

This operation makes it possible to transfer a fine uneven pattern, which is a reverse pattern of the fine uneven pattern formed on the surface of the mother stamper 21, to the light-curable resin layer 25c of the composite base material 25 (which is referred to as a transfer process (1))

In addition, the radiating device 11 radiates ultraviolet light onto the composite base material to cure the light-curable resin layer 25c, with the composite base material 25 being pressed against the surface of the mother stamper 21 (which is referred to as a curing process (2)).

Figure 6:
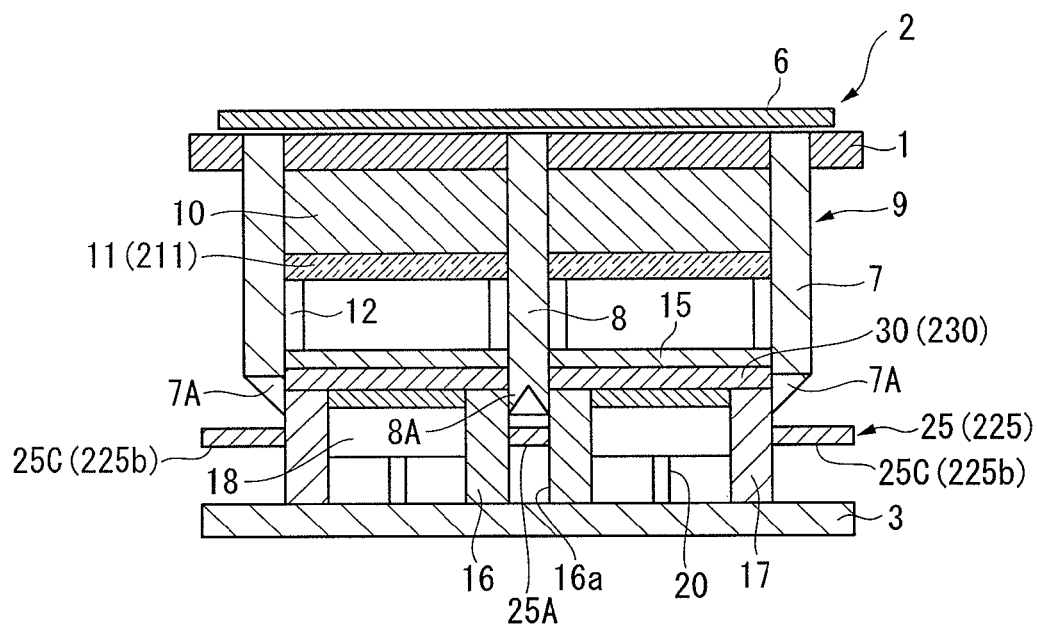
FIG. 6 is a cross-sectional view illustrating the punched state of the resin base material by the manufacturing apparatus according to the first embodiment.

Before or after the curing process, or during the curing process, as shown in FIG. 6, the cutter set member 6 is moved down to drop the outer circumferential cutter portion 7 and the inner circumferential cutter portion 8 to punch the composite base material 25 using the outer circumferential cutter blade 7A and the inner circumferential cutter blade 8A, thereby obtaining a disk-shaped resin stamper 30 (which is referred to as a punching process (3)).

During the punching process, the outer circumferential cutter blade 7 punches the composite base material 25 while sliding on an extension surface of the outer circumference of the cylindrical sliding support member 17, and the inner circumferential cutter blade 8 punches the composite base material 25 while sliding on the inside of the sliding support member 16. Therefore, it is possible to punch the composite base material 25 at a correct position, and obtain a doughnut disk-shaped stamper 30 having desired inside and outside diameters.

In addition, as shown in FIG. 6, in portions of the composite base material 25 other than the stamper 30, a central portion 25A of the composite base material 25 punched by the inner circumferential cutter blade 8A is discharged to a central concave portion 16a of the sliding support member 16, and an outer circumferential portion 25B of the composite base material 25 punched by the outer circumferential cutter blade 7A is discharged to the outer circumferential side of the sliding support member 17.

The inside diameter of the concave portion 16a of the sliding support member 16 is substantially equal to the outside diameter of the inner circumferential cutter blade 8A. Therefore, when the composite base material 25 is punched, it is possible to punch the composite base material 25 along the inner circumference of the concave portion 16a at a correct position using the inner circumferential cutter blade 8A, without any stain. As a result, it is possible to improve the accuracy of punching. In addition, the outside diameter of the sliding support member 17 is substantially equal to the inside diameter of the outer circumferential cutter blade 7A. Therefore, when the composite base material 25 is punched, it is possible to punch the composite base material 25 along the outer circumference of the sliding support member 17 at a correct position using the outer circumferential cutter blade 7A, without any stain. As a result, it is possible to improve the accuracy of punching. In this way, it is possible to punch the composite base material 25 into a doughnut disk shape having a precise inner circumference, a precise outer circumference, and high positional accuracy therebetween.

Figure 7:
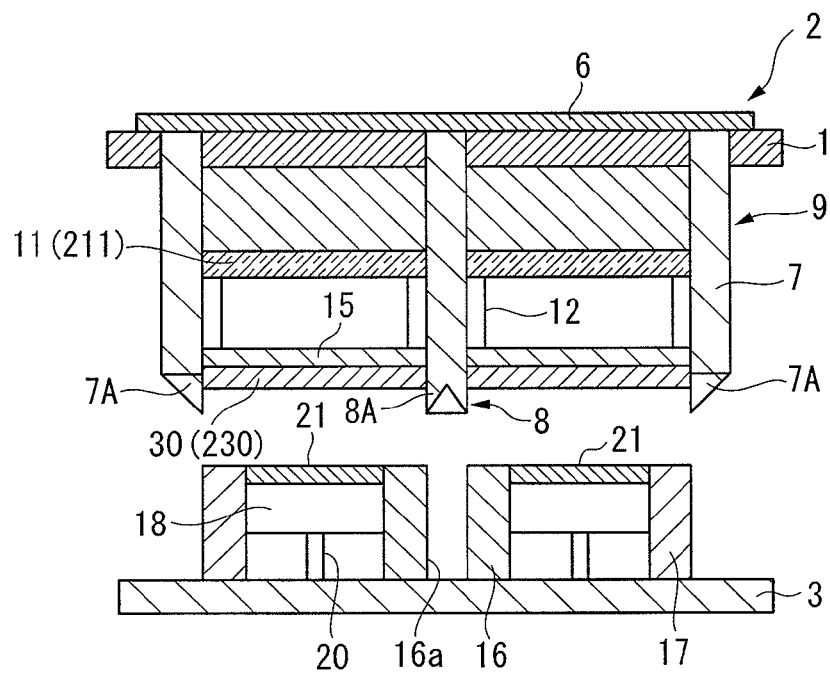
FIG. 7 is a cross-sectional view illustrating the state after the resin base material is punched by the manufacturing apparatus according to the first embodiment.
Figure 8:
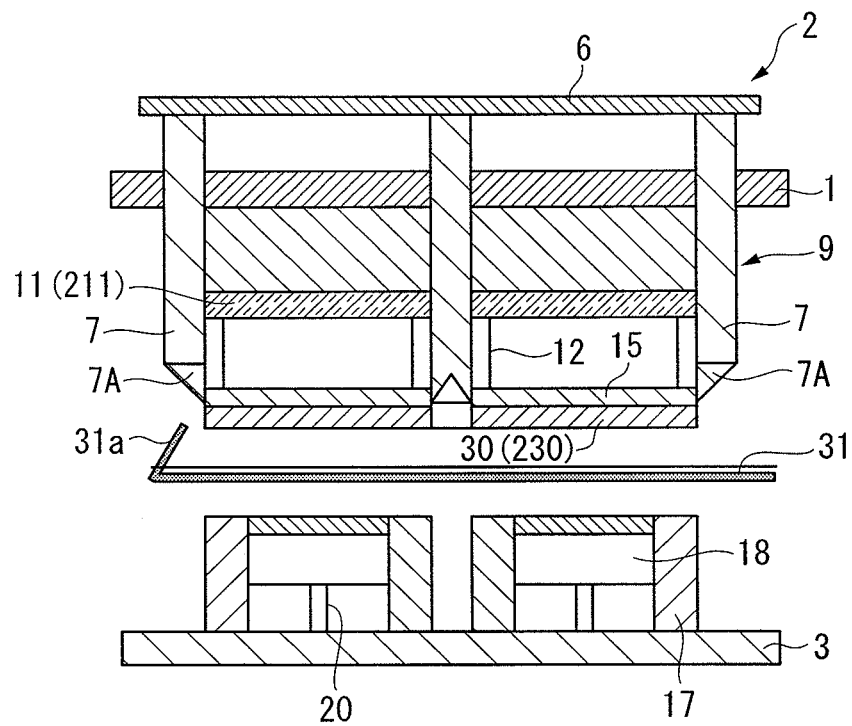
FIG. 8 is a cross-sectional view illustrating the punched resin stamper when removed from the manufacturing apparatus according to the first embodiment.

After the composite base material 25 is punched as shown in FIG. 6, the mounting plate 1 and the cutter set member 6 are lifted up, as shown in FIG. 7. Then, the stamper 30 is lifted while being interposed between the outer circumferential cutter blade 7A and the inner circumferential cutter blade 8A. Therefore, as shown in FIG. 8, the cutter set member 6 is moved upward relative to the mounting plate 1 so that the outer circumferential cutter blade 7A and the inner circumferential cutter blade 8A are removed from the stamper 30. In addition, a peeling means having a bent portion 31a at the leading end thereof, such as a takeoff rod 31, may be used to take off the stamper 30. During the takeoff operation, since the outer circumferential cutter blade 7A and the inner circumferential cutter blade 8A are removed from the stamper 30 and the stamper 30 is closely adhered to only the translucent pressing base 15, it is possible to easily take off the stamper 30 using the takeoff rod 31.

Figure 9:
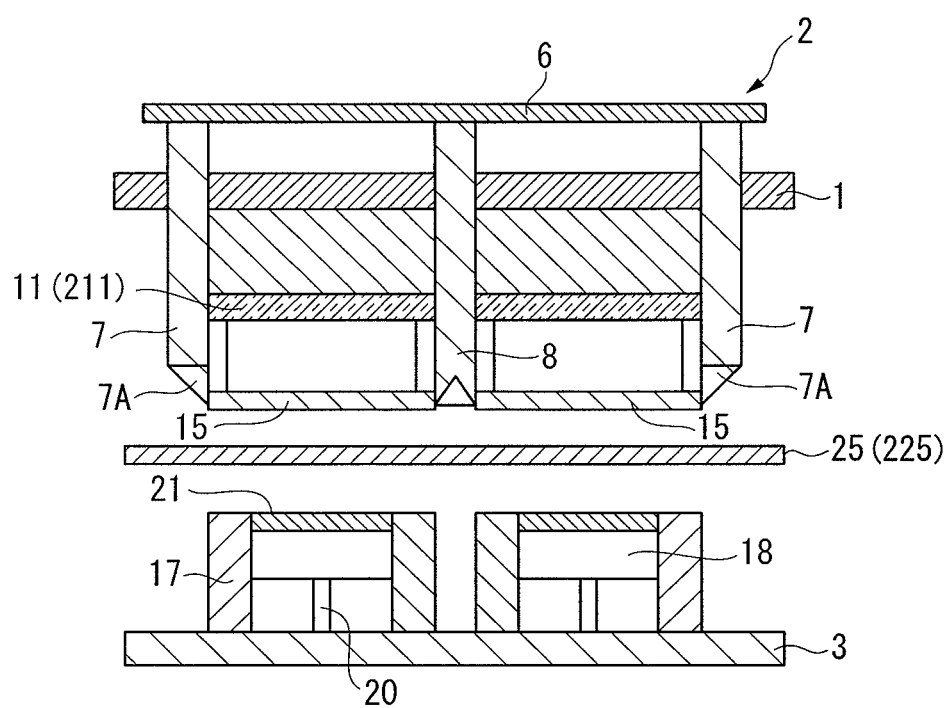
FIG. 9 is a cross-sectional view illustrating resin for another base material set in the manufacturing apparatus according to the first embodiment.

After the stamper 30 is removed from the translucent pressing base 15, another composite base material 25 is set between the translucent pressing base 15 and the mother stamper 21, as shown in FIG. 9. Then, the pressing process, the ultraviolet radiating process, and the punching process described with reference to FIGS. 2 to 8 are sequentially performed on the base material to obtain a stamper 30 by the same method as described above. This operation is repeated to mass-produce the stampers 30.

The stamper 30 manufactured by the above-mentioned method can be used to manufacture a discrete track magnetic recording medium. For example, a structure having a non-magnetic substrate and a magnetic layer or a protective layer formed on the substrate may be given as an example of this type of magnetic recording medium.

For example, the magnetic layer formed on the surface of the non-magnetic layer may be an in-plane magnetic recording layer or a vertical magnetic recording layer. It is preferable that the magnetic recording layer be formed of a Co alloy.

For example, a laminated structure of a non-magnetic CrMo underlying layer and a CoCrPtTa ferromagnetic layer may be used for a magnetic recording layer of a magnetic recording medium.

For example, a magnetic recording layer of a vertical magnetic recording medium may have a laminated structure of an underlying layer made of a soft magnetic material, such as an FeCo alloy (for example, FeCoB, FeCoSiB, FeCoZr, FeCoZrB, or FeCoZrBCu), an FeTa alloy (for example, FeTaN or FeTaC), or a Co alloy (for example, CoTaZr, CoZrNB, or CoB), an alignment control film made of, for example, Pt, Pd, NiCr, or NiFeCr, an intermediate layer (which is optional) made of, for example, Ru, and a magnetic layer made of, for example, a 60Co-15Cr-15Pt alloy or a 70Co-5Cr-15Pt-10SiO$_2$ alloy.

The thickness of the magnetic recording layer is preferably in the range of 3 nm to 20 nm, more preferably, 5 nm to 15 nm. It is preferable that the magnetic recording layer be formed so that a sufficient head input/output is obtained according to the type of magnetic alloys and the laminated structure thereof. In order to obtain a predetermined output or more during reproduction, the thickness of the magnetic layer needs to be larger than a predetermined value. However, as the output increases, various parameters indicating recording/reproducing characteristics usually deteriorate. Therefore, it is necessary to set an optimal thickness.

In general, the magnetic recording layer is formed by a sputtering method. For example, an uneven pattern is formed on the magnetic recording layer.

A protective layer is formed on the magnetic recording layer. The protective layer may be formed of a carbonaceous material, such as carbon (C), carbon hydride (HxC), carbon nitride (CN), amorphous carbon, or silicon carbide (SiC), or SiO$_2$, ZrO$_2$, or TiN. In addition, the protective film may include two or more layers.

It is necessary that the thickness of the protective layer 3 be smaller than 10 nm. If the thickness of the protective layer is larger than 10 nm, the distance between the head and the magnetic layer increases, which makes it difficult to obtain input/output signals having sufficient intensity.

In general, the magnetic recording layer is formed by a sputtering method, and an uneven pattern is formed on the magnetic recording layer. In this embodiment, a protective layer having an uneven pattern corresponding to the uneven pattern formed on the magnetic recording layer is formed. In addition, the thickness of a concave portion of the protective layer tends to be larger than that of a convex portion of the protective layer.

It is possible to use the stamper 30 according to the present invention to form a fine uneven pattern on the magnetic recording medium having the above-mentioned structure. Since the resin stamper 30 according to the present invention is cheaper than that the Ni alloy stamper according to the related art, it is possible to replace the resin stamper more frequently than the Ni alloy stamper according to the related art. Therefore, it is possible to replace the resin stamper without producing a large number of defective magnetic recording media. As a result, it is possible to prevent the occurrence of defects.

Figure 10A:
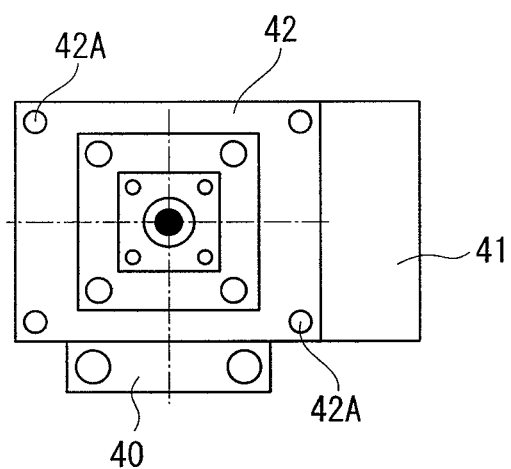
FIG. 10A is a diagram illustrating an example of the structure of a unit of the resin stamper manufacturing apparatus according to the present invention.
Figure 10B:
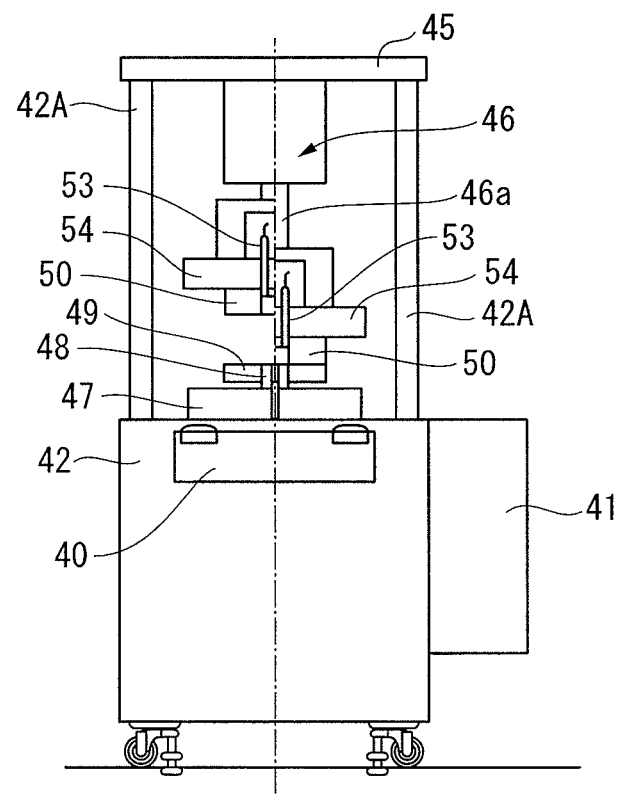
FIG. 10B is a diagram illustrating an example of the structure of the unit of the resin stamper manufacturing apparatus according to the present invention.
Figure 11:
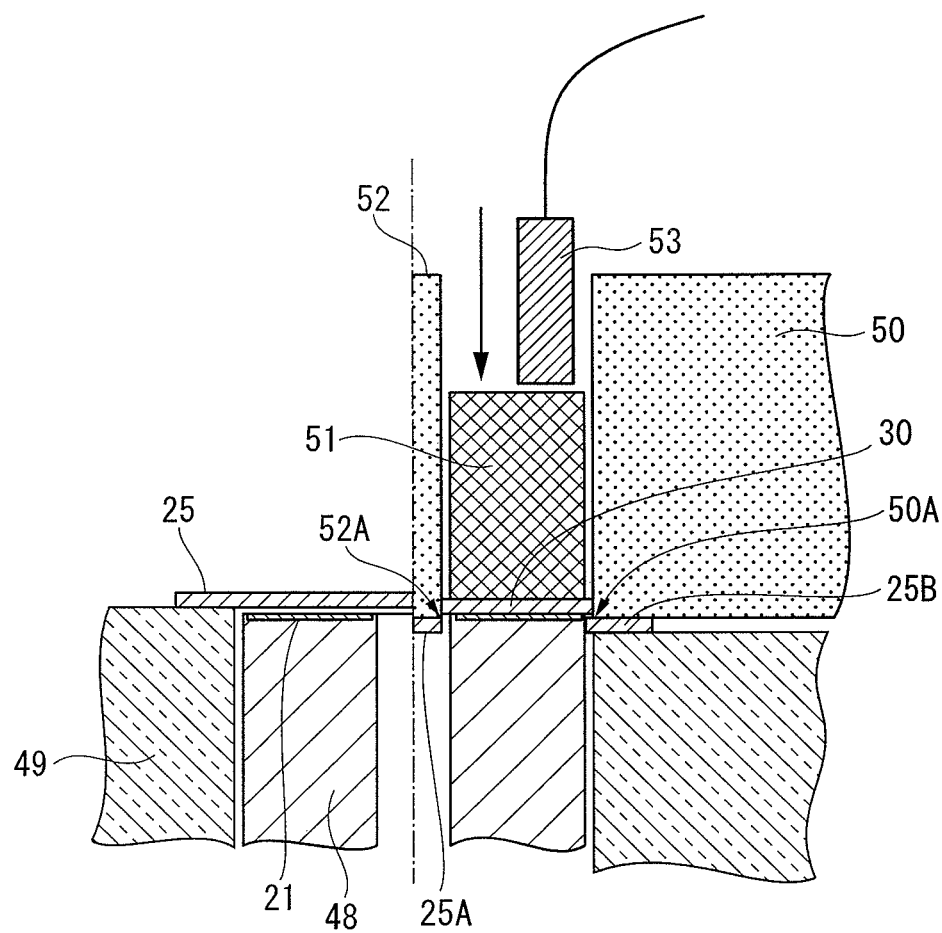
FIG. 11 is a partial cross-sectional view illustrating the manufacturing apparatus shown in FIG. 10.

FIGS. 10A and 10B are diagrams illustrating an example of a structure in which the resin stamper manufacturing apparatus shown in FIGS. 1 to 9 is incorporated into a unit, and FIG. 11 is a partially enlarged cross-sectional view illustrating the structure.

In the unit structure, a main body base 42 is provided with an operating plate 40 and a control plate 41, and four supporting columns 42A are vertically provided on the main body base 42. A roof 45 is supported by the upper ends of the supporting columns 42A, and a cylinder device 46 is provided at the center of the lower surface of the roof 45 so as to face downward. A resin stamper manufacturing apparatus having the same function as the above-mentioned resin stamper manufacturing apparatus is provided between the main body base 42 and the cylinder device 46.

A lower die set 47 is provided on the main body base 42, and a thick cylindrical punch (sliding support member) 48 is provided at the center of the lower die set. A doughnut disk-shaped strip member 49 is provided so as to surround the punch, and a doughnut-shaped upper die (outer circumferential cutter portion) 50 is provided on the strip member. A translucent pressing base 51 and an inner punch (inner circumferential cutter portion) 52 are provided inside the upper die 50, and a radiating device 53 is provided on the translucent pressing base 51 inside the upper die 50. In addition, the upper die 50 and the inner punch 52 are integrated with the upper die set 54, and the upper die set 54 is connected to an output rod 46a of the cylinder device 46 so as to be movable in the vertical direction. Therefore, the upper die (outer circumferential cutter portion) 50 and the inner punch (inner circumferential cutter portion) 52 can be moved in the vertical direction by the cylinder device 46.

In the structure shown in FIG. 10B, the inner circumference of the doughnut-shaped upper die 50 serves as an outer circumferential cutter blade 50A that punches the outer circumferential side of the resin composite base material 25, and the leading end of the inner punch 52 serves as an inner circumferential cutter blade 52A that punches the center of the resin composite base material 25.

The mother stamper 21 is provided on the upper surface of the punch 48, and a transfer pattern is formed on the upper surface of the mother stamper. The resin composite base material 25 can be interposed between the punch 48, and the upper die 50 and the translucent pressing base 51, with the upper die 50 and the translucent pressing base 51 being lifted up.

In this example, the radiating device 53 includes a plurality of light-emitting elements, such as LEDs, and can emit light in a specific wavelength range, such as ultraviolet rays. The translucent pressing base 51 is composed of a translucent member, such as an acrylic plate. During a pattern transfer process, the translucent pressing base is pressed, and transmits light in a specific wavelength range emitted from the radiating device 53 so that the light reaches the composite base material 25.

FIGS. 10B and 11 are diagrams illustrating the operation of the resin stamper manufacturing apparatus, in which different operations are performed on the left and right sides of a one-dot chain line that is vertically drawn at the center. Specifically, in FIGS. 10B and 11, the left side of the one-dot chain line shows the state in which the upper die 50 and the translucent pressing base 51 are lifted and the composite base material 25 is provided therebetween, and the right side of the one-dot chain line shows the state in which the upper die 50 and the translucent pressing base 51 are dropped to punch the composite base material 25.

As shown in FIGS. 10B and 11, the composite base material 25 is interposed between the translucent pressing base 51 and the mother stamper 21. Then, the pattern of the mother stamper 21 is transferred onto the surface of the composite base material, and the composite base material 25 is punched. Then, the radiating device 53 emits ultraviolet rays to the composite base material to cure the light-curable layer of the composite base material 25. Then, the upper die 50 and the translucent pressing base 51 are lifted. In this way, it is possible to obtain the resin stamper 30 having a pattern transferred thereto from the composite base material 25.

The other operations and effects are the same as those of the resin stamper manufacturing apparatus according to the above-described embodiment.

Figure 12:
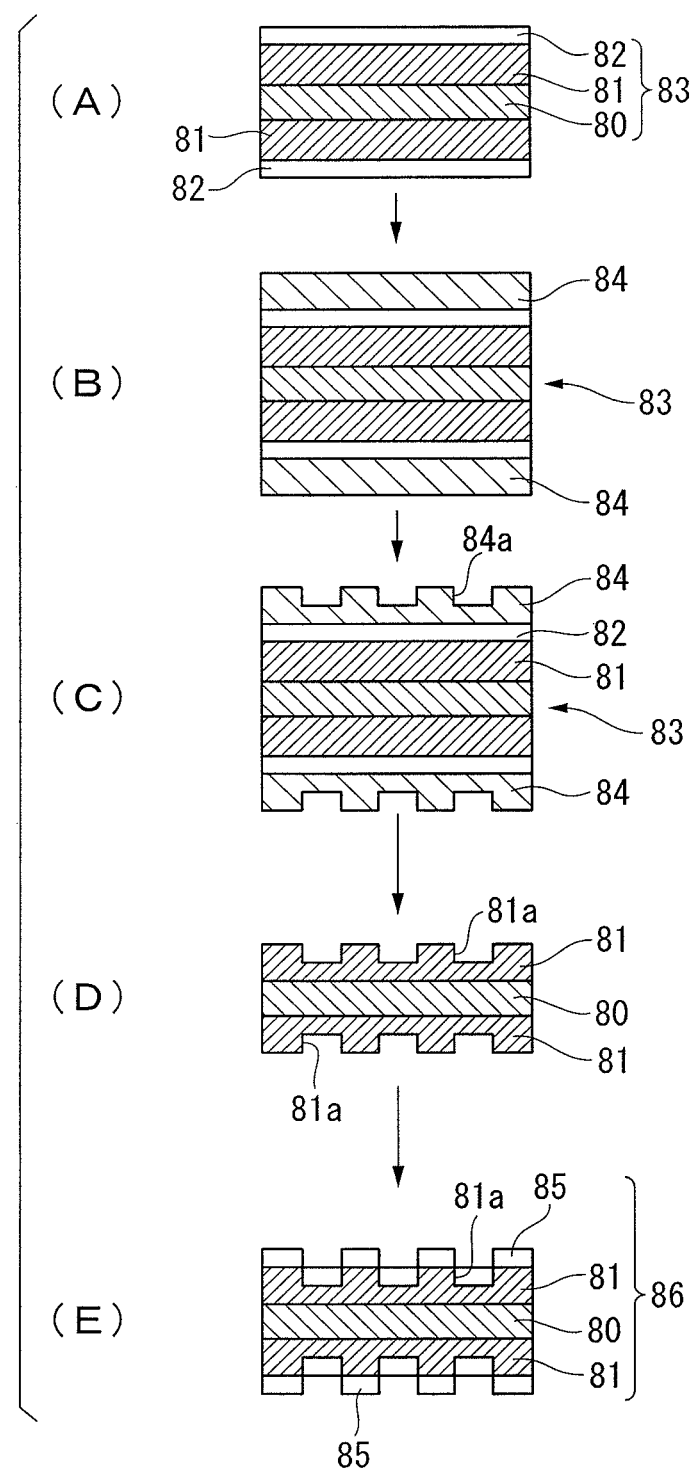
FIG. 12 is a diagram illustrating an example of a method of manufacturing a discrete track magnetic recording medium in which a fine uneven pattern is formed on a magnetic layer.

FIG. 12 is a diagram illustrating an example of a method of manufacturing a discrete track magnetic recording medium including a magnetic layer having a fine uneven pattern performed thereon.

As shown in FIG. 12(A), a magnetic layer 81 and a protective film 82 are formed on the upper and lower surfaces of a substrate 80 made of, for example, glass, thereby manufacturing a magnetic recording medium material 83. Then, resist layers 84 are formed on the upper and lower surfaces of the magnetic recording medium material 83 by a spin coating method, as shown in FIG. 12(B), and the resin stamper 30 is pressed against the resist layers 84 by an imprint method to transfer uneven portions 84a having a concentric circle shape in plan view on the resist layers 84, as shown in FIG. 12(C). Then, etching is sequentially performed on the resist layer 84, the protective film 82, and the magnetic layer 81 using the uneven portions 84a, thereby obtaining a discrete track magnetic recording medium material having uneven portions 81a formed on the magnetic layer 81, as shown in FIG. 12(D). Then, protective films 85 are formed on both surfaces of the material to obtain a discrete track magnetic recording medium 86 shown in FIG. 12(E).

As described above, the resin stamper 30 is used to form the fine uneven portions 84a on the surfaces of the resist layers 84. Therefore, it is possible to accurately form the fine uneven portions 84a having a concentric circle shape, and it is possible to accurately form the uneven portions 81a having a concentric circle shape on the surface of the magnetic layer 81 using the fine uneven portions 84a. As a result, it is possible to divide the tracks of the magnetic film 81.

In the discrete track magnetic recording medium show in FIG. 12(D), the protective film 85 may be planarized, if necessary.

The imprinting process may be formed at a pressure of, for example, 60 MPa or less. The pressure can be calculated by dividing compressive force by the area of the stamper. That is, the pressure can be calculated by dividing the weight detected by a press machine by the area of the stamper.

In this embodiment, the size of the composite base material 25 is larger than the outside diameter of the resin stamper 30. However, the composite base material 25 may have any shape with respect to the resin stamper 30.

Figure 13:
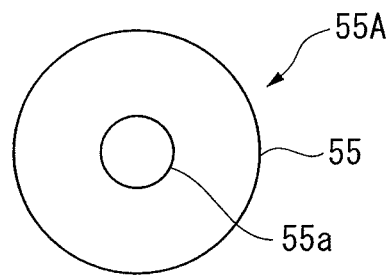
FIG. 13 is a plan view illustrating a second example of the base material according to the present invention.
Figure 14:
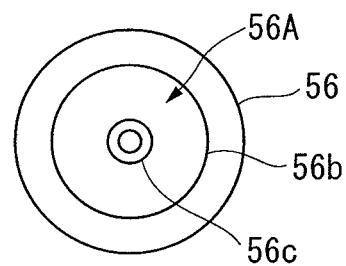
FIG. 14 is a plan view illustrating a third example of the base material according to the present invention.

As shown in FIG. 13, a disk-shaped base material 55 may be prepared in advance, and the base material 55 may be punched so that a circular hole 55a is formed at the center of the base material, thereby forming a resin stamper 55A. As shown in FIG. 14, a doughnut disk-shaped base material 56 having a circular hole 56a at its center is punched to form a resin stamper 56A having an outer circumferential portion 56b and an inner circumferential portion 56c.

The shape of the hole 55a is not limited to a circle, but it may be a rectangle or a polygon.

Figure 15:
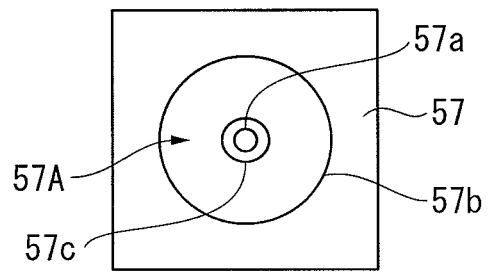
FIG. 15 is a plan view illustrating a fourth example of the base material according to the present invention.
Figure 16:
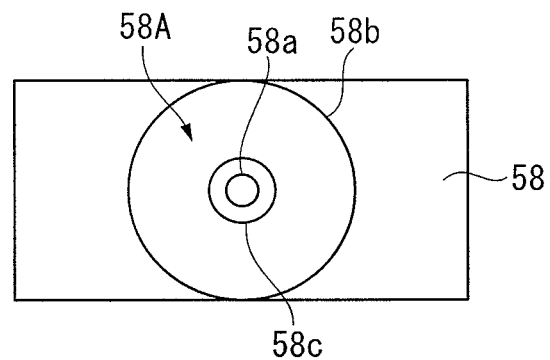
FIG. 16 is a plan view illustrating a fifth example of the base material according to the present invention.

As shown in FIG. 15, a square base material 57 having a circular hole 57a at its center may be punched to form a resin stamper 57A having an outer circumferential portion 57b and an inner circumferential portion 57c. As shown in FIG. 16, a rectangular base material 58 having a circular hole 58a at its center (a rectangular base material having a short side that is some millimeters smaller than the diameter of a desired resin stamper) may be punched to form a resin stamper 58A having an outer circumferential portion 58b and an inner circumferential portion 58c.

As described above, in the resin stamper 58A obtained by punching the rectangular base material 58 having a short side that is some millimeters smaller than the diameter of a desired resin stamper, the outer circumferential portion 58b does not have a completely circular shape, but a portion of the outer circumferential portion 58b is linear. Therefore, the linear portion may be used as a check portion for chucking the resin stamper 58A.

Figure 17:
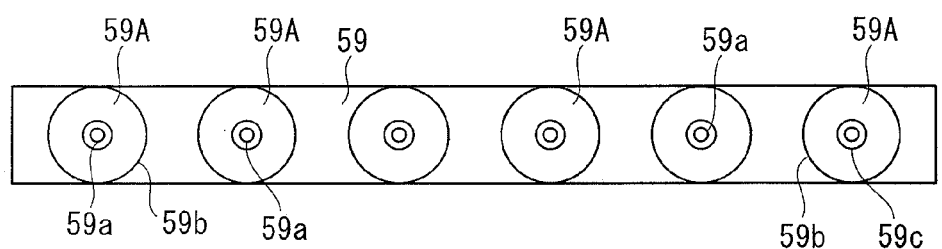
FIG. 17 is a plan view illustrating a sixth example of the base material according to the present invention.

As shown in FIG. 17, a long tape-shaped base material 59 having a plurality of circular holes 59a formed at predetermined intervals therein may be punched to form a plurality of resin stampers 59A each having an outer circumferential portion 59b and an inner circumferential portion 59c that are concentric with the corresponding hole 59a in the base material 59. As shown in FIG. 17, the use of the long tape-shaped base material 59 makes it possible to continuously manufacture a plurality of resin stampers 59A from the base material 59.

In the base material 59 having the structure shown in FIG. 17, a slit or a cutting portion may be formed between adjacent resin stampers 59A to easily divide the resin stampers 59A formed in the base material 59.

The shape of the hole or the outer circumferential portion shown in FIGS. 11 to 15 is not limited to a circle, but the hole or the outer circumferential portion may have any shape. For example, it may have a polygonal shape, such as a triangle or a rectangle, or an elliptical shape.

Figure 18:
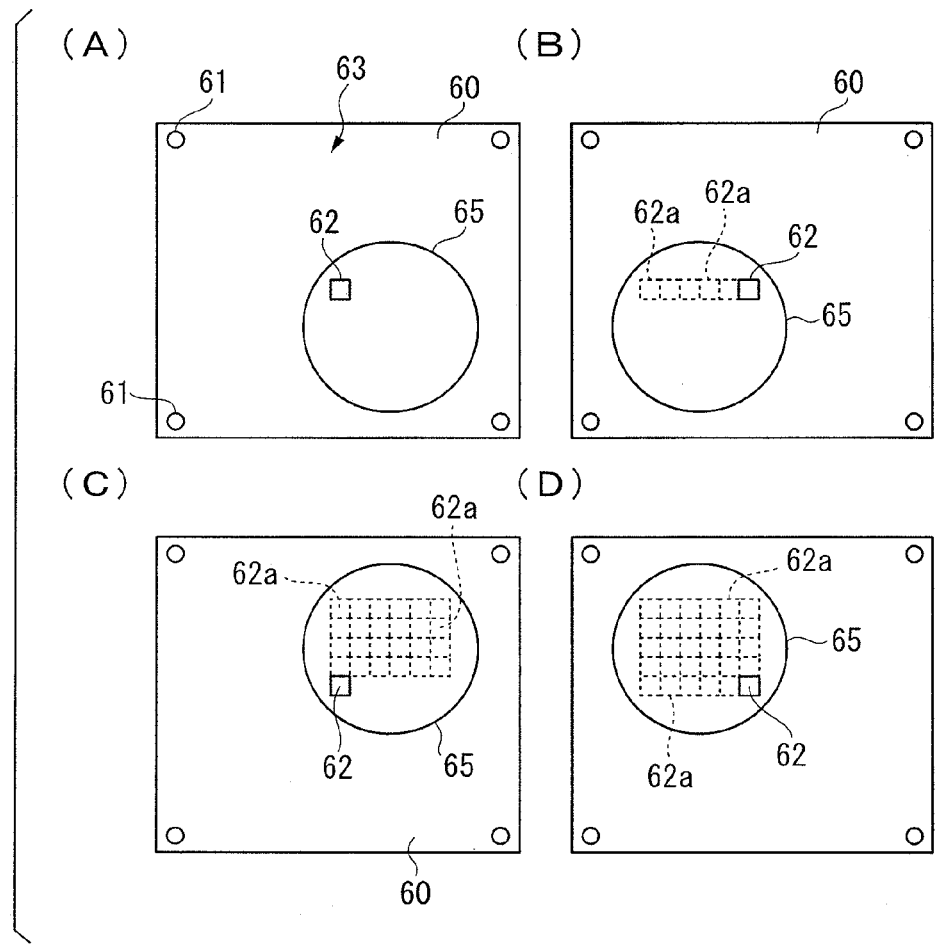
FIG. 18 is a diagram illustrating an example in which a method according to the present invention is used to pattern a semiconductor substrate for manufacturing a semiconductor device.
Figure 19:
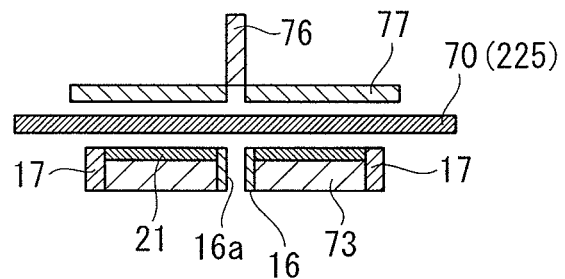
FIG. 19 is a diagram illustrating the structure of the resin stamper manufacturing apparatus according to the present invention when it is used in a thermosetting resin base material.

FIG. 18 is a diagram illustrating an example in which the resin stamper according to the present invention is applied to a pattern exposure process in a method of manufacturing a semiconductor device. As shown in FIG. 18(A), clearance holes 61 for guide pins of a semiconductor exposure apparatus positioning stepper are formed at four corners of a rectangular resin base material 60 made of, for example, fluororesin, and a desired pattern 62 is transferred onto a portion of the base material 60 by a transfer technique using the mother stamper 21, thereby forming a resin stamper 63.

In this example, a resist layer made of, for example, an ultraviolet-curable resin is applied on a semiconductor substrate 65, such as a Si wafer for forming a semiconductor device, by a spin coating method, and the resin stamper according to the present invention can be used to pattern the resist layer.

When the guide pins of the stepper of the semiconductor exposure apparatus are inserted into the clearance holes 61 of the base material 60 to align the semiconductor substrate 65 and a plurality of patterns are formed on the semiconductor substrate, the base material 60 is positioned and the pattern 62 formed on the base material 60 is positioned at the desired location of the semiconductor substrate 65. Then, the above-mentioned method is used to press the pattern 62 against the resist layer on the semiconductor substrate 65 to transfer a first pattern, thereby forming a pattern 62a.

When the first pattern transfer process ends, a positioning device, such as the semiconductor device stepper, is used to move the base material 60 to a predetermined position in the horizontal direction, relative to the semiconductor substrate 65, and the pattern 62 is used to perform a second transfer process at that position, thereby forming a second pattern 62a. These processes are repeatedly performed on the semiconductor substrate 65 a predetermined number of times to form a row of patterns 62a, as show in FIG. 18(B).

Then, as shown in FIGS. 18(C) and 18(D), pattern transfer processes are sequentially performed to transfer the patterns 62a to the entire surface of the resist layer in a desired region of the semiconductor substrate 65.

The next process, for example, etching may be performed on the semiconductor substrate 65 having the patterned resist layer to perform desired processes on the semiconductor substrate.

In the general semiconductor manufacturing process according to the related art, in order to pattern the resist layer, the stepper of the semiconductor manufacturing apparatus positions a semiconductor substrate, an exposure process using a photomask is performed to sequentially expose necessary regions of the semiconductor substrate, and a developing process is performed on the exposed semiconductor substrate to form an uneven pattern. However, in the present invention, the resin stamper is used to transfer a predetermined pattern 62a, such as an uneven pattern, to the resist layer. Therefore, it is possible to pattern the resist layer at a lower cost than the related art. As a result, it is possible to reduce the costs of manufacturing a semiconductor device.

FIGS. 19 to 22 are diagrams illustrating an example in which a base material including a heat-curable resin is used to manufacture the resin stamper according to the present invention.

The base material used in this example may include the hard layer 25a and the soft resin layer 25b of the composite base material 25, and a thermosetting resin, serving as the curing resin layer 25c, instead of the light-curable resin.

Examples of applicable curable resins include:

mono(meth)acrylates such as methyl(meth)acrylate, ethyl (meth)acrylate, n-propyl(meth)acrylate, isopropyl(meth)acrylate, n-butyl(meth)acrylate, isobutyl(meth)acrylate, sec-butyl(meth)acrylate, hexyl(meth)acrylate, octyl(meth)acrylate, 2-ethylhexyl(meth)acrylate, decyl(meth)acrylate, isobornyl(meth)acrylate, cyclohexyl(meth)acrylate, phenyl (meth)acrylate, benzyl(meth)acrylate, 2-hydroxyethyl(meth) acrylate, 2-hydroxypropyl(meth)acrylate, 3-hydroxypropyl (meth)acrylate, 2-hydroxybutyl(meth)acrylate, or 2-hydroxyphenylethyl(meth)acrylate;

(meth)acrylamides such as N,N-dimethyl(meth)acrylamide, N,N-diethyl(meth)acrylamide, or N-acryloylmorpholine;

polyfunctional(meth)acrylates such as ethyleneglycol di(meth)acrylate, propyleneglycol di(meth)acrylate, 1,4-butanedioldi(meth)acrylate, diethyleneglycol di(meth)acrylate, triethyleneglycol di(meth)acrylate, trimethylolpropane di(meth)acrylate, trimethylolpropane tri(meth)acrylate, or pentaerythritol penta(meth)acrylate; (meth)acrylic resins such as epoxy(meth)acrylates which are obtained by adding (meth)acrylate to epoxy resins, such as a bisphenol A epoxy resin, a hydrogenated bisphenol A epoxy resin, a brominated bisphenol A epoxy resin, a bisphenol F epoxy resin, a novolac epoxy resin, a phenol-novolac epoxy resin, a cresol-novolac epoxy resin, a cycloaliphatic epoxy resin, an N-glycidyl epoxy resin, a novolac bisphenol A epoxy resin, a chelated epoxy resin, a glyoxal epoxy resin, an amino group-containing epoxy resin, a rubber-modified epoxy resin, a dicyclopentadiene phenolic epoxy resin, a silicone-modified epoxy resin, or a ε-caprolactone-modified epoxy resin;

allyl ethers such as ethyleneglycol monoallylether or allylglycidylether;

monoallyl esters such as allyl acetate or allyl benzoate;

diallylamine, diallyl esters such as 1,4-cyclohexaneallyldicarbonate, diallyl phthalate, diallyl terepthalate, or diallyl isopthalate;

allyl resins such as allyl ester resins which are obtained by adding allyl alcohol to oligoesters such as oligopropylene terepthalate;

monovinyl ethers such as n-propylvinylether, isopropyl vinyl ether; n-butylvinylether, isobutyl vinyl ether, 2-ethylhexylvinylether, octadecyl vinyl ether, or cyclohexyl vinyl ether;

monovinyl esters such as vinyl acetate, vinyl propionate, vinyl butyrate, or vinyl benzoate;

divinyl esters such as divinyl adipate;

N-vinylamides such as N-vinylpyrrolidone, or N-methyl-N-vinylacetamide;

styrene derivatives such as styrene, 2,4-dimethyl-α-methylstyrene, o-methylstyrene, m-methylstyrene, p-methylstyrene, 2,4-dimethylstyrene, 2,5-dimethylstyrene, 2,6-dimethylstyrene, 3,4-dimethylstyrene, 3,5-dimethylstyrene, 2,4,6-trimethylstyrene, 2,4,5-trimethylstyrene, pentamethylstyrene, o-ethylstyrene, m-ethylstyrene, p-ethylstyrene, o-chlorostyrene, m-chlorostyrene, p-chlorostyrene, o-bromostyrene, m-bromostyrene, p-bromostyrene, o-methoxystyrene, m-methoxystyrene, p-methoxystyrene, o-hydroxystyrene, m-hydroxystyrene, p-hydroxystyrene, 2-vinylbiphenyl, 3-vinylbiphenyl, 4-vinylbiphenyl, 1-vinylnaphthalene, 2-vinylnaphthalene, 4-vinyl-p-terphenyl, 1-vinylanthracene, α-methylstyrene, o-isopropenyl toluene, m-isopropenyl toluene, p-isopropenyl toluene, 2,4-dimethyl-α-methylstyrene, 2,3-dimethyl-α-methylstyrene, 3,5-dimethyl-α-methylstyrene, p-isopropyl-α-methylstyrene, α-ethylstyrene, or α-chlorostyrene;

divinyl ethers such as ethyleneglycol divinyl ether, 1,4-butanediol divinylether, 1,6-hexanediol divinyl ether, 1,9-nonanediol divinylether, cyclohexane dimethanol divinyl ether, diethyleneglycol divinyl ether, or triethyleneglycol divinyl ether;

polyfunctional vinyl ethers such as trimethylolpropane trivinyl ether or pentaerythritol tetravinyl ether;

divinyl aryls such as divinyl benzene or divinylphenyl;

mono-oxetanyl compounds such as 3-ethyl-3-hydroxymethyl oxetane or 3-ethyl-3-methacryl oxymethyloxetane;

polyfunctional oxetane resins such as Aronoxetane OXT-121 (trade name) and OX-SQ (trade name) manufactured by Toagosei. Co., Ltd, or OXTP (trade name) and OXBP (trade name) manufactured by Nippon Steel Chemical Co., Ltd.;

epoxy resins such as a bisphenol A epoxy resin, a hydrogenated bisphenol A epoxy resin, a brominated bisphenol A epoxy resin, a bisphenol F epoxy resin, a novolac epoxy resin, a phenol-novolac epoxy resin, a cresol-novolac epoxy resin, an N-glycidyl epoxy resin, a novolac bisphenol A epoxy resin, a chelated epoxy resin, glyoxal epoxy resin, an amino group-containing epoxy resin, a rubber-modified epoxy resin, a dicyclopentadiene phenolic epoxy resin, a silicone-modified epoxy resin, a ε-caprolactone-modified epoxy resin, or a cycloaliphatic epoxy resin;

polyamic acid, which is a precursor of polyamide; and the like.

An apparatus for manufacturing a resin stamper according to this embodiment transfers the pattern of the mother stamper 21 to a base material 70 including a thermosetting resin layer, and punches the base material.

Similar to the above-mentioned example, sliding support members 16 and 17 are provided, and the mother stamper 21 is provided above the sliding support members. Below the mother stamper 21, a cooling plate 73 is provided between the sliding support members 16 and 17, and an inner circumferential cutter portion 76 having an inner circumferential cutter blade for punching only the center of the base material 70 is provided above the mother stamper 21. The outer circumferential cutter portion provided in the above-described example is omitted.

In this example, instead of the first mounting plate 1 provided in the above-mentioned example, a heating plate 77 for guiding the inner circumferential cutter portion 76 is provided, and the heating plate 77 and the inner circumferential cutter portion 76 are movable in the vertical direction to approach or be separated from the mother stamper 21. The heating plate 77 has a heater provided therein, and the temperature of the heating plate 77 can be controlled on the basis of whether a voltage is applied to the heater or the amount of current flowing through the heater.

Figure 20:
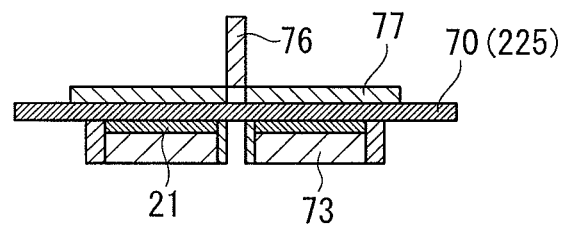
FIG. 20 is a diagram illustrating the state in which the base material is pressed against the mother stamper in the manufacturing apparatus.

In this example, in order to transfer the pattern of the mother stamper 21 to the base material 70 and punch the base material 70, the apparatus lifts the heating plate 77 to separate the heating plate from the mother stamper 21. In this state, the base material 70 is interposed between the heating plate 77 and the mother stamper 21, and the heating plate 77 presses the base material 70 against the mother stamper 21, as shown in FIG. 20.

Then, the pattern of the mother stamper 21 is transferred to the base material 70, and the base material 70 is cured so that the pattern is fixed.

Figure 21A:
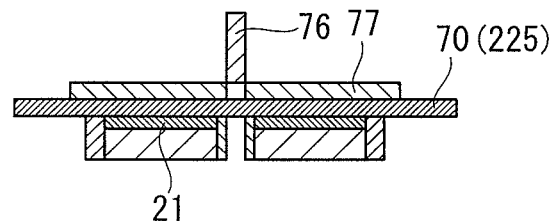
FIG. 21A is a diagram illustrating a process of punching a base material using the manufacturing apparatus.
Figure 21B:
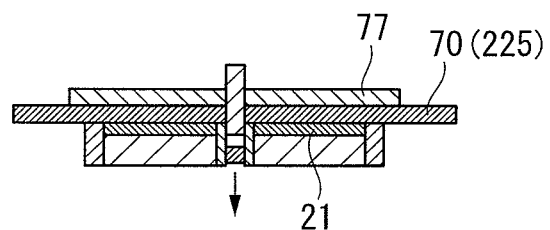
FIG. 21B is a diagram illustrating a process of punching a base material using the manufacturing apparatus.

Then, the flow of current to the heater of the heating plate 77 stops to reduce the temperature of the base material 70, and the cooling plate 73 is used to reduce the temperature of the base material 70 to the glass transition temperature (Tg) or less of the resin forming the base material 70. Then, as shown in FIGS. 21A and 21B, the inner circumferential cutter portion 76 is dropped to punch the center of the base material 70. In the present invention, the glass transition temperature (Tg) may be measured by, for example, a method defined by JIS K7121 using a differential scanning calorimeter.

Figure 22A:
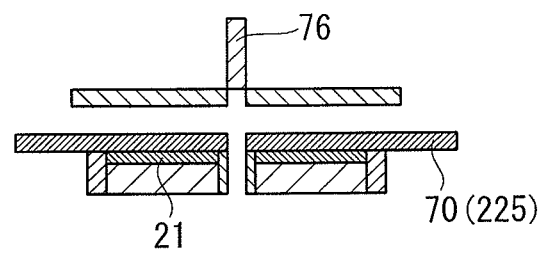
FIG. 22A is a diagram illustrating the resin stamper when removed from the manufacturing apparatus.
Figure 22B:
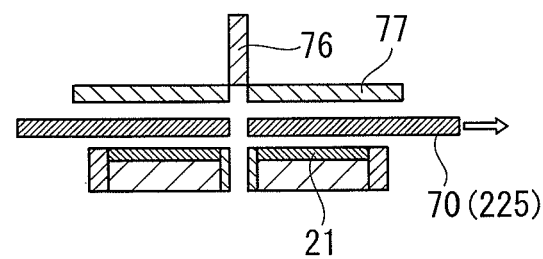
FIG. 22B is a diagram illustrating the resin stamper when removed from the manufacturing apparatus.

As shown in FIGS. 22A and 22B, after the punching process, the inner circumferential cutter portion 76 and the heating plate 77 are lifted to take out the base material 70. After the base material 70 is taken out, the heater of the heating plate 77 is turned on again and a base material 70 is set on the mother stamper 21. Then, the apparatus returns to the process shown in FIG. 19, and repeatedly performs the pattern transfer process and the punching process on the base material 70.

In this embodiment, only the center of the base material 25 is punched. However, as in the apparatus according to the first example, the apparatus may include cutter blades that punch the edge and the center of the base material 25. In addition, the structure of a manufacturing apparatus may be appropriately changed depending on the shape of a base material or a punching position.

Figure 23A:
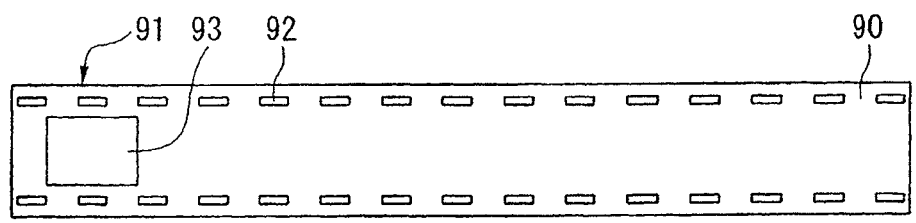
FIG. 23A is a diagram illustrating a first example of an imprint method when the present invention is applied to a long film-shaped base material.
Figure 23B:
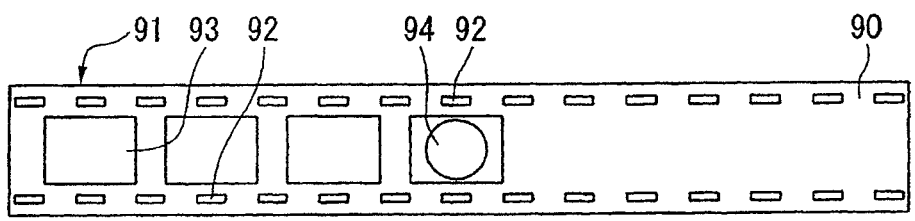
FIG. 23B is a diagram illustrating the first example of the imprint method when the present invention is applied to a long film-shaped base material.
Figure 23C:
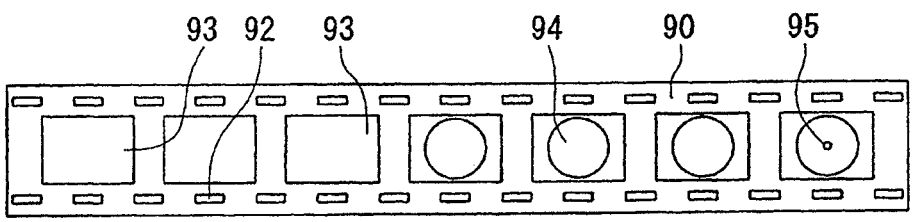
FIG. 23C is a diagram illustrating the first example of the imprint method when the present invention is applied to a long film-shaped base material.

FIGS. 23A to 23C are diagrams illustrating a composite base material 91, which is the second example of the above-mentioned composite base material, obtained by applying or printing a curing resin as a liquid on a portion of a base material 90, which is a cured film or a sheet of, for example, a thermoplastic resin or a thermosetting resin, and an imprint method using the composite base material.

As shown in FIG. 23A, in order to manufacture the composite base material 91, the base material 90 that has a long strip shape, such as a moving picture film, and has a plurality of slit-shaped positioning holes 92 formed at both ends in the width direction at predetermined intervals is prepared, and a liquid curing resin is applied onto the center of the base material 90 by a screen printing method or a gravure printing method to intermittently form a predetermined number of rectangular curing resin layers 93 at the center of the base material 90 in the longitudinal direction thereof. In this example, the resin layers are intermittently printed in the longitudinal direction of the base material, but they may be printed on the entire surface of the base material. Then, the resin stamper manufacturing apparatus according to the above-mentioned embodiment is used to press the mother stamper and radiates energy beams to cure the liquid resin, thereby forming the same pattern portions 94 as the pattern portions or the uneven portions formed in the above-mentioned example, as shown in FIG. 23B. Then, only the center of each of the pattern portions 94 is punched to form a punched portion 95, as shown in FIG. 23C. Then, if necessary, finally, a punching machine may be used to punch the resin layer into a disk shape, thereby obtaining a doughnut disk-shaped product.

Figure 24A:
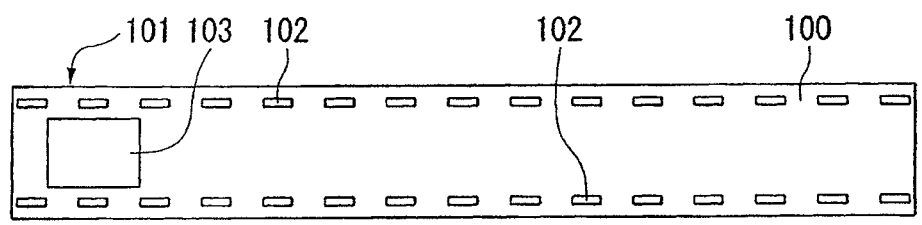
FIG. 24A is a diagram illustrating a second example of the imprint method when the present invention is applied to a long film-shaped base material.
Figure 24B:
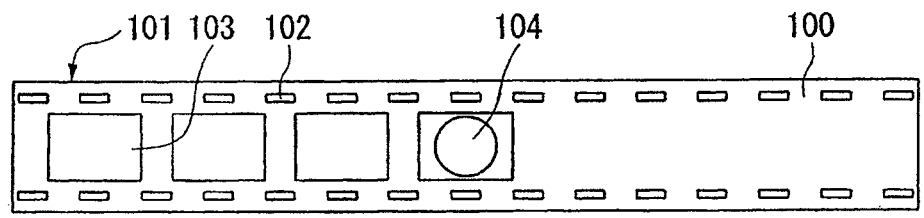
FIG. 24B is a diagram illustrating the second example of the imprint method when the present invention is applied to a long film-shaped base material.
Figure 24C:
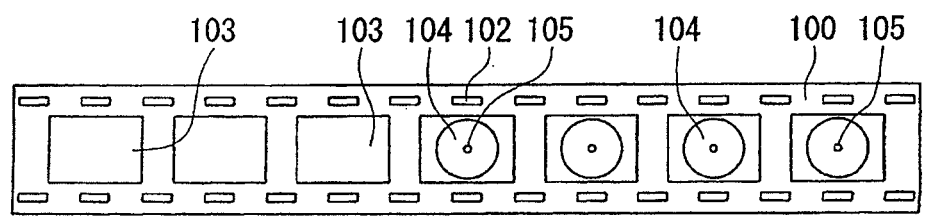
FIG. 24C is a diagram illustrating the second example of the imprint method when the present invention is applied to a long film-shaped base material.

FIGS. 24A to 24C are diagrams illustrating a composite base material 101, which is a modification of the second example of the above-mentioned composite base material, obtained by applying or printing a curing resin as a liquid on a portion of a base material 188, which is a cured film or sheet of, for example, a thermoplastic resin or a thermosetting resin, and an imprint method using the composite base material.

As shown in FIG. 24A, in order to manufacture the composite base material 101, the base material 100 that has a long strip shape, such as a moving picture film, and has a plurality of slit-shaped positioning holes 102 formed at both ends in the width direction at predetermined intervals is prepared, and a liquid curing resin is applied onto the center of the base material 100 by a screen printing method or a gravure printing method to intermittently form a predetermined number of rectangular curing resin layers 103 at the center of the base material 100 in the longitudinal direction thereof. In this example, the resin layers are intermittently printed in the longitudinal direction of the base material, but they may be printed on the entire surface of the base material. Then, the resin stamper manufacturing apparatus according to the above-mentioned embodiment is used to press the mother stamper and radiates energy beams to cure the liquid resin, thereby forming the same pattern portions 104 as the pattern portions or the uneven portions formed in the above-mentioned example, as shown in FIG. 24B. Then, if necessary, a process of punching the pattern into a disk shape may be performed. Alternatively, only the center of each of the pattern portions 104 may be punched to form a punched portion 105, as shown in FIG. 24C, and the pattern portion may be finally punched into a disk shape. In addition, it is preferable that the pattern portions 104 and the punched portions 105 be integrally formed by, for example, the method shown in FIGS. 1 to 11 using the same apparatus, in order to improve manufacturing efficiency.

In the methods described with reference to FIGS. 23A to 23C and FIGS. 24A to 24C, a polyethylene terephthalate (PET) film having one surface subjected to an adhesion process may be used as the base material 90 or 100, and the thickness thereof may be in the range of 5 to 100 μm.

Figure 25A:
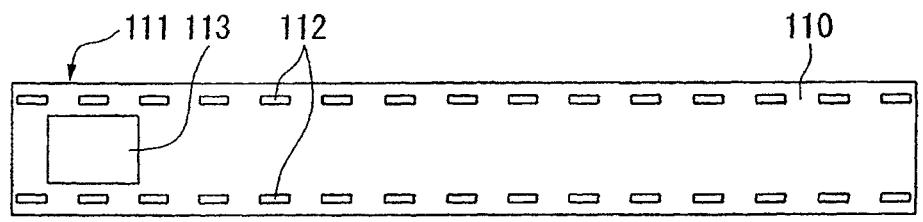
FIG. 25A is a diagram illustrating a third example of the imprint method when the present invention is applied to a long film-shaped base material.
Figure 25B:
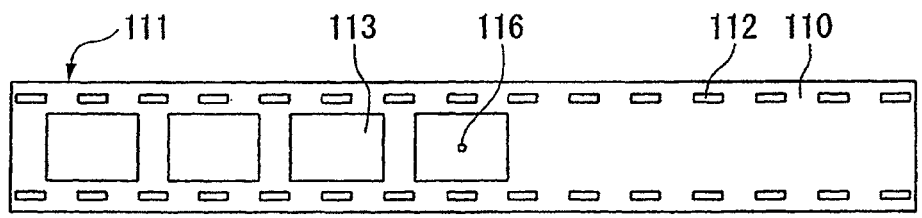
FIG. 25B is a diagram illustrating the third example of the imprint method when the present invention is applied to a long film-shaped base material.
Figure 25C:
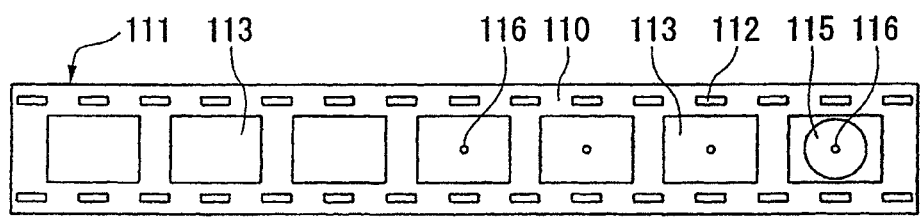
FIG. 25C is a diagram illustrating the third example of the imprint method when the present invention is applied to a long film-shaped base material.

FIGS. 25A to 25C are diagrams illustrating a composite base material 111, which is another modification of the second example of the above-mentioned composite base material, obtained by applying or printing a curing resin as a liquid on a portion of a base material 110, which is a cured film or sheet of, for example, a thermoplastic resin or a thermosetting resin, and an imprint method using the composite base material.

As shown in FIG. 25A, in order to manufacture the composite base material 111, the base material 110 that has a long strip shape, such as a moving picture film, and has a plurality of slit-shaped positioning holes 112 formed at both ends in the width direction at predetermined intervals is prepared, and a liquid curing resin is applied onto the center of the base material 110 by a screen printing method or a gravure printing method to intermittently form a predetermined number of rectangular curing resin layers 113 at the center of the base material 100 in the longitudinal direction thereof. In this example, the resin layers are intermittently printed in the longitudinal direction of the base material, but they may be printed on the entire surface of the base material. Then, as shown in FIG. 25B, the center of a desired pattern portion is punched to form a punched portion 116, and the resin stamper manufacturing apparatus according to the above-mentioned embodiment is used to press the mother stamper and radiates energy beams to cure the liquid resin, thereby forming the same pattern portions 115 as the pattern portions or the uneven portions formed in the above-mentioned example, as shown in FIG. 25C. Then, if necessary, a process of punching the pattern into a disk shape may be performed.

In this example, after the punched portion 116 is formed, the punched portion 116 is used to align the mother stamper with the pattern portion, and an imprint process of pressing the mother stamper and radiating energy beams to cure the liquid resin is performed. Therefore, it is possible to accurately determine a pattern forming location.

In addition, it is preferable that the pattern portions 115 and the punched portions 116 be integrally formed by the same apparatus, in order to improve manufacturing efficiency.

Figure 26A:
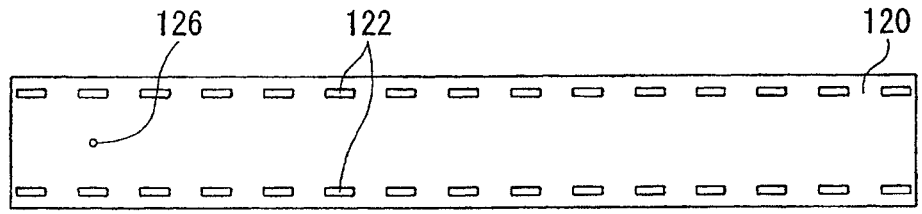
FIG. 26A is a diagram illustrating a fourth example of the imprint method when the present invention is applied to a long film-shaped base material.
Figure 26B:
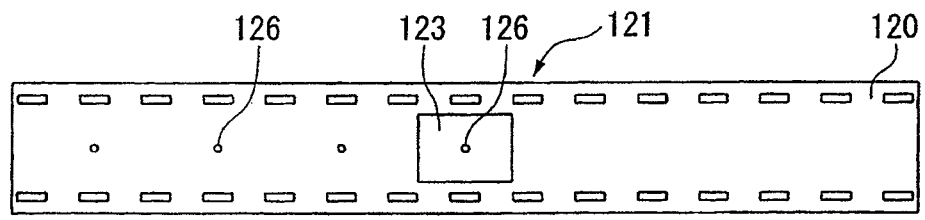
FIG. 26B is a diagram illustrating the fourth example of the imprint method when the present invention is applied to a long film-shaped base material.
Figure 26C:
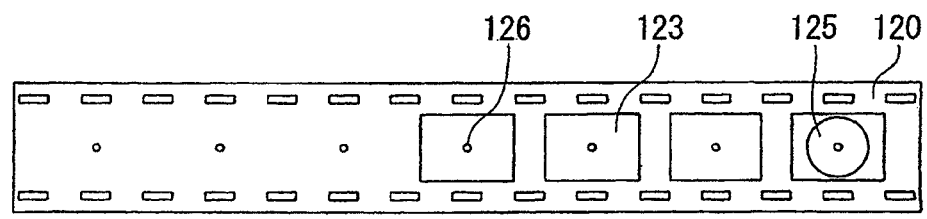
FIG. 26C is a diagram illustrating the fourth example of the imprint method when the present invention is applied to a long film-shaped base material.

FIGS. 26A to 26C are diagrams illustrating a composite base material 121, which is still another modification of the second example of the above-mentioned composite base material, obtained by applying or printing a curing resin as a liquid on a portion of a base material 120, which is a cured film or sheet of, for example, a thermoplastic resin or a thermosetting resin, and an imprint method using the composite base material.

As shown in FIG. 26A, in order to manufacture the composite base material 121, the base material 120 that has a long strip shape, such as a moving picture film, and has a plurality of slit-shaped positioning holes 122 formed at both ends in the width direction at predetermined intervals is prepared. Then, as shown in FIG. 26A or 26B, the centers of pattern portions to be formed are punched to form punched portions 126. Then, as show in FIG. 26B or 26C, a liquid curing resin is applied onto the center of the base material 120 by a screen printing method or a gravure printing method to intermittently form a predetermined number of rectangular curing resin layers 123 at the center of the base material 120 in the longitudinal direction thereof, thereby manufacturing the composite base material 121. In this example, the resin layers are intermittently printed in the longitudinal direction of the base material, but they may be printed on the entire surface of the base material. Then, an imprint process of using the resin stamper manufacturing apparatus according to the above-mentioned embodiment to press the mother stamper and radiating energy beams to cure the liquid resin is performed to form the same pattern portions 125 as the pattern portions or the uneven portions formed in the above-mentioned example, as shown in FIG. 26C. Then, if necessary, finally, a process of punching the pattern into a disk shape may be performed.

In this example, after the punched portion 126 is formed, the punched portion 126 is used to align the mother stamper with the pattern portion, and an imprint process of pressing the mother stamper and radiating energy beams to cure the liquid resin is performed. Therefore, it is possible to accurately determine a pattern forming location.

Examples

Manufacture of Laminated Film 100 g of phenol-novolac epoxy acrylate solution KAYARAD PNA-170H (trade name, manufactured by Nippon Kayaku Co., Ltd.) and 2.0 g of photoinitiator Irgacure 184 (trade name, manufactured by Ciba Speciality Chemicals Ltd.) were mixed with each other, the mixture was applied on hard films shown in Table 1, and the hard films were dried in a hot blast oven at a temperature of 80° C. for 60 minutes, thereby manufacturing laminated films A to E. Table 1 shows the structures of the films A to E.

TABLE 1

| Laminated film | Hard resin film | Tensile modulus (GPa) | Tensile elongation (%) | UV transmittance[6] (%) | Thickness (μm) |
|---|---|---|---|---|---|
| A | Cosmo Shine A4100[1] | | 120 | >30 | 100 |
| B | ZF-14[2] | | 40 | >30 | 188 |
| C | PANLITE SHEET PC2151[3] | 2.5 | 50 | >30 | 300 |
| D | OPULENT X-88B[4] | 2.1 | 60 | >30 | 50 |
| E | Thermosetting urethane resin[5] film | 2.6 | 3 | >30 | 50 |

Remarks
[1] Polyethylene terephthalate film manufactured by Toyobo Co., Ltd.
[2] Zeonor sheet manufactured by Optes Inc.
[3] Aromatic polycarbonate sheet manufactured by Teijin Chemicals, Ltd.
[4] Methylpentene copolymer film manufactured by Mitsui Chemicals, Inc.
[5] 10 g of UCE-5 manufactured by Meisei Chemical Works, Ltd., 0.95 g of Seroxide 2021P manufactured by Daicel Chemical Industries, Ltd., and 0.05 g of Curezol 1B2PZ manufactured by Shikoku Chemical Corporation are mixed, the mixture is cast on a polyethylene terephthalate film, the film is heated at a temperature of 80° C. for 60 minutes and then at a temperature of 120° C. for 180 minutes, and the polyethylene terephthalate film is peeled off.
[6] For ultraviolet rays in a wavelength range of 220 nm to 400 nm <Manufacture of Resin Stamper>

The mother stamper 21 was set to the apparatus shown in FIGS. 10A and 10B with a pattern surface facing upward, the laminated films A to E manufactured as described above were cut to have a width of 70 mm, and the laminated films were set with the surfaces on which an epoxy acrylate solution was applied facing downward.

The laminated film was inserted into a mold, and the mother stamper 21 was pressed against the laminated film at a pressure of 30 MPa for 10 seconds. Then, the illumination of the radiating device 11 (an LED lamp emitting light in a wavelength range of 365 nm) was adjusted to 15 mW/cm$^2$, and UV light was emitted to the laminated film for 10 seconds while pressing the laminated film. Then, the emission of UV light stopped, and the inner circumferential cutter blade 52A was used to punch a hole having a diameter of 12 mm at the center of the pattern. At the same time, the outer circumferential cutter blade 50A was used to cut the pattern in a circular shape. Then, the upper die set 54 was lifted to take out the sample. In this way, the resin stampers A1 to E1 were manufactured.

A laser microscope was used to measure the transfer ratio of the pattern to the resin stampers A1 to E1, and a measuring microscope was used to measure the deviation of the punched inner circumferential portion from the center of the pattern and the circularity thereof. The measured results are shown in Table 2. As can be seen from Table 2, a precise punching process is performed.

The pattern transfer ratio shown in Table 2 means (the number of patterns to be transferred according to the design)/

(the number of patterns observed) when random 100 patterns are observed. This is similarly applied to the pattern transfer ratio shown in Table 3.

When the diameter of the punched portion is measured at five points at an angular interval of about 72°, a difference between the maximum value and the minimum value indicates the circularity.

TABLE 2

| Resin stamper | Laminated film used | Pattern transfer ratio | Deviation of punched portion from center of pattern | Circularity |
|---|---|---|---|---|
| A1 | A | 1 | <10 μm | <10 μm |
| B1 | B | 1 | <10 μm | <10 μm |
| C1 | C | 1 | <10 μm | <10 μm |
| D1 | D | 1 | <10 μm | <10 μm |
| E1 | E | 1 | <10 μm | <10 μm |

The cutter blades 7 and 8 of the apparatus shown in FIGS. 6 and 7 were made of stainless steel, and the translucent pressing base 15 was made of tempered glass having a size of 100 mm×100 mm×40 mm. As the mother stamper 21, the following was used: a structure including a doughnut-shaped plate that was manufactured by Ni electroforming and had a thickness of 0.3 mm, an inside diameter of 16 mm, and an outside diameter of 63.5 mm and a concentric pattern which was formed on the doughnut-shaped plate and in which convex and concave portions had a height of 80 nm, the convex portion had a width of 120 nm, and the concave portion had a width of 80 nm.

<Manufacture of HD Substrate with Resist Film>

A cleaned HD (hard disk) glass substrate (having an outside diameter of 1.89 inches manufactured by Ohara Inc.) was set in a vacuum chamber, and the vacuum chamber was evacuated at $1.0 \times 10^{-5}$ Pa or less in advance.

Then, a 65Fe-25Co-10B (at %) layer having a thickness of 50 nm, a Ru layer having a 0.8 nm, and a 65Fe-25Co-10B (at %) layer having a thickness of 50 nm were sequentially formed on the substrate without heating, and a soft magnetic back layer was formed on the laminate.

Then, an alignment control layer was formed of Ru with a thickness of 20 nm, an oxide granular recording layer was formed of 65Co-10Cr-15Pt-10SiO$_2$ (mol %) with a thickness of 12 nm, and a protective film was formed of carbon with a thickness of 4 nm.

Then, the medium including the protective film (HD substrate) was taken out from the vacuum chamber, and a resist (PAK-01-60: trade name, manufactured by Toyo Gosei Co., Ltd.) was applied on the medium by a spin coater at 2000 rpm. After the application, the medium was dried on a hot plate at a temperature of about 80° C. for 3 minutes. The thickness of the resist was measured by a reflective/transmissive film thickness meter, and the thickness of the resist was about 80 nm.

<Imprint of Resist Film on HD Substrate Using Resin Stamper>

The manufactured HD substrate (with the resist surface facing downward) and the manufactured resin stamper (with the pattern surface facing upward) were set in this order on a die set of a nanoimprint apparatus ST-200 (manufactured by Toshiba Machine Co., Ltd.), and the nanoimprint apparatus was set at a predetermined position.

The nanoimprint apparatus pressed the substrate against the resin stamper at a pressing force of 0.6 MPa for 10 seconds, and radiated ultraviolet rays in the wavelength range of 365 nm with a luminous intensity of 15 mW/cm$^2$ using an LED lamp, without changing the pressing force. Then, the mold was opened and the HD substrate was taken out.

The resin stamper was removed from the HD substrate. Then, a laser microscope was used to measure the pattern transfer ratio of the substrate, and a measuring microscope was used to the deviation of the pattern from the center of the HD substrate. The center of the HD substrate was a point that was equidistant from five points which are on a hole of the HD substrate at an angular interval of about 72°. The distance was measured by the measuring microscope. The center of the pattern was a point that was equidistant from five points which were on the innermost one of the concentric circles at an angular interval of about 72°. A distance between the center of the HD substrate and the center of the pattern measured in this way was measured as the deviation of the pattern.

The measured results are shown in Table 3. As can be seen from Table 3, when the resin stamper manufactured by the apparatus and method according to the present invention is used to imprint a pattern on the resist film on the HD substrate, it is possible to transfer a pattern with a high pattern transfer ratio.

TABLE 3

| HD substrate | Resin stamper used | Time required for molding[1] | Pattern transfer ratio | Deviation from center of pattern |
|---|---|---|---|---|
| A2 | A1 | <60 seconds | 97% | <20 μm |
| B2 | B1 | <60 seconds | 98% | <20 μm |
| C2 | C1 | <60 seconds | 98% | <20 μm |
| D2 | D1 | <60 seconds | 97% | <20 μm |
| E2 | E1 | <60 seconds | 96% | <20 μm |

[1]The time required to perform the following process:
set a substrate and a resin to a die set
→ set the die set to an imprint apparatus
→ pressing and UV radiation
→ demolding
→ take off the substrate <Repeat Test for Imprint of Resist Film on HD Substrate Using Resin Stamper>

As a resin stamper, 100 resin stampers C1 were manufactured. Similar to the above-mentioned example, UV imprinting was performed on the HD substrate 100 times while changing the resin stampers, and a surface inspection apparatus was used to observe whether dust was caught and the substrate was damaged. As the result of the observation, the percent defective was 1/100.

<Example of Using Film having Low Ultraviolet Transmittance>

UV imprinting was performed on an HD substrate by the same method as described above except that a resin stamper was formed of a hard film KAPTON 500H (polyimide film trade name, manufactured by Du Pont-Toray Co., Ltd., thickness: 125 μm, tensile modulus: 3.4 GPa, and ultraviolet transmittance: <30%). The transfer ratio of the HD substrate was <10%.

<Example of Using Film having Low Tensile Elongation>

10 g of UCE-5 manufactured by Meisei Chemical Works, Ltd., 1.4 g of Epicoat YX8000 manufactured by Japan Epoxy Resin Co., Ltd., and 0.05 g of Curezol IB2PZ manufactured by Shikoku Chemical Corporation were mixed, the mixture was cast on a polyethylene terephthalate film, the film was heated at a temperature of 80° C. for 60 minutes and at a temperature of 120° C. for 180 minutes, and the polyethylene terephthalate film was peeled off to manufacture a thermosetting resin film F. The film F had a tensile modulus of 3.0 MPa, a tensile elongation of 2%, and a UV transmittance of 30% or more.

A resin stamper was manufactured by the same method as described above, except that the thermosetting resin film F was used as a hard film. Cracks occurred in the resin stamper.
<Example of Using Film having Low Tensile Modulus>

A resin stamper was manufactured by the same method as described above, except that a polyethylene film (having a thickness of 100 μm and a tensile modulus of 1.0 GPa) was used as a hard film. The circularity was greater than or equal to 60 μm.
<Example of Using Ni Stamper>

UV imprinting was performed on the resist films of 100 HD media by the same method as described above, except that a cleaned HD glass substrate (having an outside diameter of 1.89 inches manufactured by Ohara Inc.) capable of transmitting ultraviolet rays was used instead of the above-mentioned HD medium, a Ni-electroformed stamper (which has a doughnut shape having a thickness of 0.3 mm, an inside diameter of 12 mm, and an outside diameter of 63.5 mm) having the same pattern as described above was used as the stamper, and the stamper was not changed. In this case, the percent defective was $52/100$.

It is considered that the reason is that defects occur due to dust caught during manufacture, which causes defective samples to be manufactured in the next imprinting process.

Second Embodiment

Next, a second embodiment of the present invention will be described in detail with reference to the accompanying drawings. The structure of a resin stamper manufacturing apparatus according to this embodiment is similar to that of the resin stamper manufacturing apparatus according to the first embodiment, except that a heating device 211 is provided instead of the radiating device 11 in the resin stamper manufacturing apparatus according to the first embodiment, so that heat generated by a heat source, such as a heater provided in the heating device 211, can be transmitted downward. Therefore, in the resin stamper manufacturing apparatus according to this embodiment, a description of the same components as those in the first embodiment will be omitted.

In order to manufacture a resin stamper using the manufacturing apparatus having the structure shown in FIG. 1, a base material of the resin stamper is prepared.

Figure 27A:
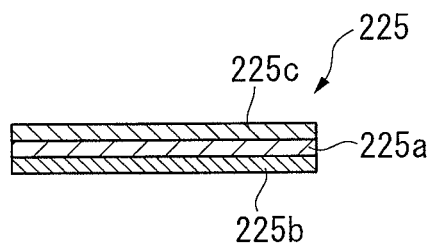
FIG. 27A is a cross-sectional view illustrating a first example of the resin base material punched by the manufacturing apparatus according to the first embodiment of the present invention.
Figure 27B:
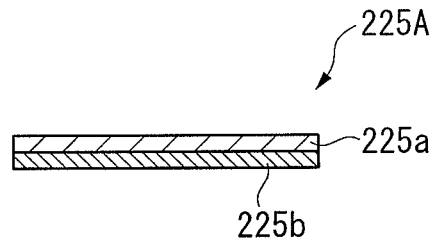
FIG. 27B is a cross-sectional view illustrating a second example of the resin base material punched by the manufacturing apparatus according to the first embodiment of the present invention.

As an example of the base material, any of the following may be used: sheet or film-shaped base materials 225 and 225A having a multi-layer structure, such as a three-layer structure shown in FIG. 27A or a two-layer structure shown in FIG. 27B. In this embodiment, the three-layer base material 225 includes a base layer 225a, a front layer 225b, and a rear layer 225c, and the two-layer base material 225A includes the base layer 225a and the front layer 225b.

In the base materials 225 and 225A according to this embodiment, the front layer 225b is formed of a thermoplastic resin having a glass transition temperature of 40° C. or more and a tensile modulus of 1.5 GPa or more at a temperature of 25° C., preferably, a tensile modulus in the range of 2.0 to 5.0 GPa and a glass transition temperature in the range of 60 to 150° C. When the tensile modulus is smaller than the above-mentioned range, a fine pattern is likely to be deformed. When the tensile modulus is greater than the above-mentioned range, the toughness or the impact resistance of the resin stamper may be lowered. When the glass transition temperature is lower than the above-mentioned range, the thermal deformation resistance of the resin stamper may be lowered. When the glass transition temperature is higher than the above-mentioned range, it is difficult to form the resin stamper.

The base layer 225a is formed of a low-elasticity resin having a tensile modulus of 1.0 GPa or less at a temperature of 25° C., preferably, a tensile modulus in the range of 0.1 MPa to 0.5 GPa, more preferably, in the range of 0.5 MPa to 0.1 GPa. When the tensile modulus is smaller than the above-mentioned range, the rigidity of the resin stamper may be lowered and the shape of the resin stamper may be unstable. If the tensile modulus is greater than the above-mentioned range, it is difficult to follow little distortion of a base material or a substrate when the resin stamper according to the present invention is used to imprint a pattern on a thin active energy beam curable resin film formed on the base material or the substrate.

The tensile modulus can be measured by, for example, a method defined by JIS K7113. The followability of the resin stamper to the base material or the substrate is generally affected by rigidity at an imprint temperature. However, since the imprint is not fixed and it is complicated to perform measurement at each molding temperature, imprint adaptability was determined on the basis of the value measured at a temperature of 25° C.

The glass transition temperature can be measured by, for example, a method defined by JIS K7121 using a differential scanning calorimeter. It is preferable that both the front layer 225b and the base layer 225a be formed of a material having high ultraviolet transmittance and the transmittance of a multi-layer sheet-shaped base material with respect to ultraviolet rays in the wavelength range of 200 nm to 400 nm be 20% or more.

For example, the front layer 225b may be formed of any of the following resins: aromatic polyester, such as polyethylene terephthalate or polyethylene naphthalate; cycloolefin polymer, such as ZEONOR (trade name, manufactured by Zeon Corporation), TOPAS (trade name, manufactured by Polyplastics Co., Ltd.), or ARTON (trade name, manufactured by JSR Corporation); rigid thermoplastic resin, such as aromatic polycarbonate or alicyclic polyimide; and polyolefin-based thermoplastic resin, such as polypropylene, poly-4-methyl-pentene, polystyrene, or PMMA copolymer. The thickness of the front layer 225b may be in the range of about 10 to 3000 μm.

The base layer 225a is preferably formed of a material that has a low elastic modulus at room temperature and does not flow at a molding temperature. For example, the base layer may be formed of transparent crosslinked rubber, such as silicone rubber or urethane rubber, or transparent crystalline resin, such as poly(3-methylpenten-1).

Additionally, resins that can be used for the base layer 225a are as follows:

cured product of polyfunctional(meth)acrylates such as polyethyleneglycol di(meth)acrylate, polypropyleneglycol di(meth)acrylate, polytetramethyleneglycol di(meth)acrylate, or polypropyleneoxide di(meth)acrylate;

cured product of epoxy acrylates such as ethylene oxide-modified bisphenol A di(meth)acrylate, propylene oxide-modified bisphenol A di(meth)acrylate, ethylene oxide-modified trimethylolpropane tri(meth)acrylate, propylene oxide-modified trimethylolpropane poly(meth)acrylate, ethylene oxide-modified pentaerythritol poly(meth)acrylate, propylene oxide-modified pentaerythritol poly(meth)acrylate, propylene oxide-modified glycerine poly(meth)acrylate;

cured product of urethane acrylates such as KAYARAD UX-7101 (trade name) manufactured by Nippon Kayaku co., ltd;

aliphatic glycidyl ethers, diglycidylphthalates, or glycidylamines;

cured product of epoxy resins such as rubber-modified epoxy resin or silicone-modified epoxy resin;

Aronoxetane OXT-121 (trade name) manufactured by Toagosei. Co., Ltd, or Eternacoll OXBP (trade name) manufactured by Ube Industries, Ltd.; and cured product of carboxyl group-containing urethane resins such as those disclosed in JP-A-2006-348278 and JP-A-2006-312729.

The thickness of the base layer 225a may be in the range of about 20 to 500 μm.

The base material 225 may include a rear layer 225c that is provided on the surface of the base layer opposite to the front layer 225b and is made of resin having a glass transition temperature and a tensile modulus that are greater than or equal to those of the resin forming the front layer 225b, in addition to the base layer 225a and the front layer 225b. It is preferable that the base material be formed of a resin having a glass transition temperature and a tensile modulus that are greater than those of the resin forming the front layer 225b. When the rear layer 225c is provided, the overall UV transmittance of the base material 225 is preferably greater than or equal to 20%. For example, the rear layer 225c may be formed of a thermoplastic resin having a glass transition temperature and a tensile modulus that are greater than or equal to those of the resin forming the front layer 225b, among the resins forming the front layer 225b. The rear layer makes it possible to prevent the deformation or damage of the base material during imprint or in the subsequent process, and improve the thermal deformation resistance of the base material during thermal imprinting.

Additionally, resins that can be used for the rear layer 225c are as follows:

thermosetting resins;

cured product of polyfunctional (meth)acrylates such as 1-4, butandiol(meth)acrylate, tricyclodecane dimethanoldi (meth)acrylate, ethyleneglycol di(meth)acrylate, diethyleneglycol di(meth)acrylate, triethyleneglycol di(meth)acrylate, propyleneglycol di(meth)acrylate, trimethylolpropane tri(meth)acrylate, ditrimethylolpropane tetra(meth)acrylate, pentaerithrytol hexa(meth)acrylate, or dipentaerithrytol hexa (meth)acrylate;

cured product of urethane acrylates such as KAYARAD UX-5001T (trade name) manufactured by Nippon Kayaku co., ltd;

cured product of allyl ester resins such as DD201 (trade name) manufactured by Showa Denko K.K;

cured product of unsaturated polyester reins;

cured product of epoxy resins such as a bisphenol A epoxy resin, a bisphenol F epoxy resin, a phenol-novalac epoxy resin, or a cresol-novalac epoxy resin;

cured product of oxetane resins such as Aronoxetane PNOX-1009 (trade name) manufactured by Toagosei. Co., Ltd; and cured product of carboxyl group-containing urethane resins such as those disclosed in JP-A-2006-233009 and JP-A-2006-312729.

The base material 225 according to the present invention may include an adhesive resin layer that adheres the base layer 225a, the front layer 225b, and the rear layer 225c, in addition to the layer 225a, the front layer 225b, and the rear layer 225c. Alternatively, the base material may have a laminated structure of four or more layers including a resin layer other than the above-mentioned three layers.

Next, compression molding for transferring the fine pattern of the mother stamper to the base material will be described.

When the glass transition temperature of the front layer 225b is referred to as $Tg_4$, the base material is heated at a temperature of $(Tg_4-10)°$ C. or more, and the mother stamper is pressed against the surface of the front layer 225b at a pressure in the range of 0.01 to 60 MPa. Then, the front layer is cooled down to the room temperature that is less than or equal to 50° C. It is preferable that the upper limit of temperature being heated up to be $(Tg_4+100)°$ C. in terms of the heat resistance of the base material.

Figure 2:
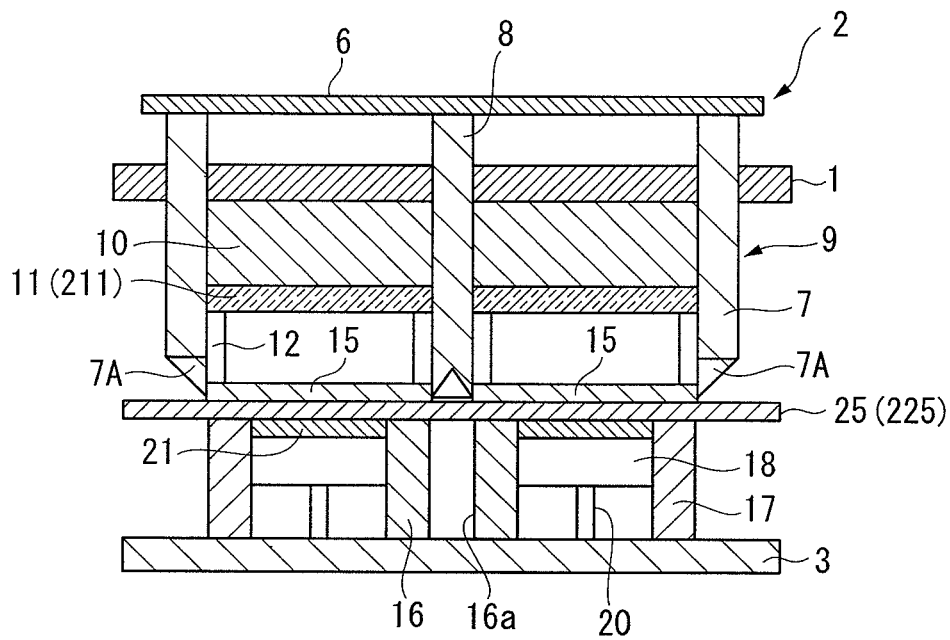
FIG. 2 is a cross-sectional view illustrating a mother stamper pressed against a resin base material in the manufacturing apparatus according to the first embodiment.
Figure 3:
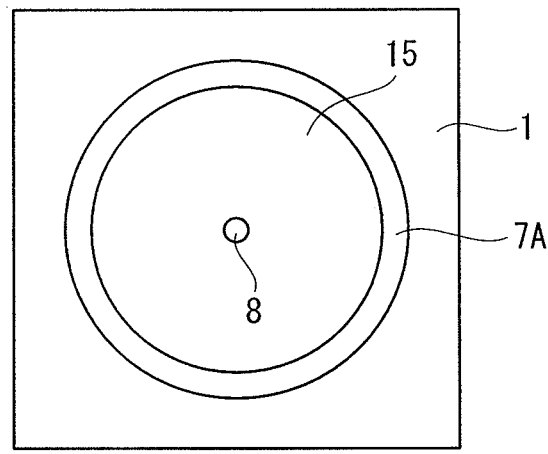
FIG. 3 is a bottom view illustrating a translucent pressing base used in the manufacturing apparatus according to the first embodiment.
Figure 4:
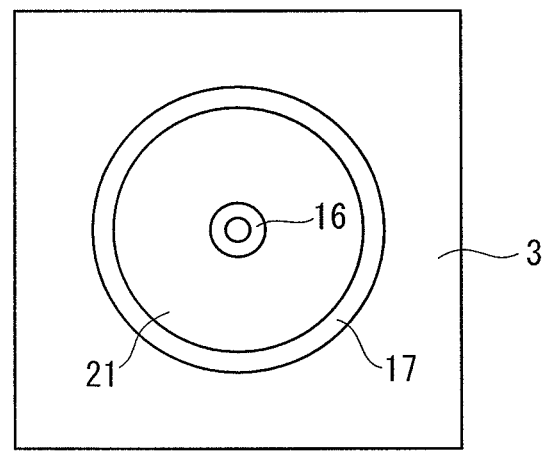
FIG. 4 is a plan view illustrating the mother stamper used in the manufacturing apparatus according to the first embodiment.

In order to perform compression molding, as shown in FIG. 1, the sheet-shaped base material 225 shown in FIG. 1 is interposed between the mother stamper 21 and the pressing base 15 with the front layer 225b facing downward, and the first mounting plate 1 is dropped so that the pressing base 15 presses the base material 225 against the surface of the mother stamper 21 at a predetermined pressure, as shown in FIG. 2. The mother stamper 21 is formed of a material capable of being precisely processed, such as a metal plate (for example, Ni alloy plate) that is made of a material capable of precisely forming a fine uneven pattern using the current molding technology may be applied for the mother stamper.

This operation makes it possible to transfer a fine uneven pattern, which is a reverse pattern of the fine uneven pattern formed on the surface of the mother stamper 21, to the front layer 225b of the base material 225.

After the compression molding is completed, as show in FIG. 6, the cutter set member 6 is dropped, and the outer circumferential cutter portion 7 and the inner circumferential cutter portion 8 are dropped so that a doughnut disk-shaped resin stamper 230 is punched out from the base material 225 by the outer circumferential cutter blade 7A and the inner circumferential cutter blade 8A. During the punching process, the outer circumferential cutter blade 7 punches the base material 225 while sliding along the outer circumferential portion of the cylindrical sliding support member 17, and the inner circumferential cutter blade 8 punches the base material 225 while sliding along the inside of the sliding support member 16. Therefore, it is possible to punch the base material 225 at a correct position. As a result, it is possible to obtain a disk-shaped resin stamper 230 having desired inside and outside diameters.

In this structure, the inside diameter of the concave portion 16a of the sliding support member 16 is substantially equal to the outside diameter of the inner circumferential cutter blade 8A. Therefore, when the base material 225 is punched, it is possible to punch the base material 225 along the inner circumference of the concave portion 16a at a correct position using the inner circumferential cutter blade 8A, without any stain. As a result, it is possible to improve the accuracy of punching. In addition, the outside diameter of the sliding support member 17 is substantially equal to the inside diameter of the outer circumferential cutter blade 7A. Therefore, when the base material 225 is punched, it is possible to punch the base material 225 along the outer circumference of the sliding support member 17 at a correct position using the outer circumferential cutter blade 7A, without any stain. As a result, it is possible to improve the accuracy of punching. In this way, it is possible to punch the base material 225 into a doughnut disk shape having a precise inner circumference, a precise outer circumference, and high positional accuracy therebetween.

After the base material 225 is punched as shown in FIG. 6, the mounting plate 1 and the cutter set member 6 are lifted up, as shown in FIG. 7. Then, the stamper 230 is lifted while being interposed between the outer circumferential cutter blade 7A and the inner circumferential cutter blade 8A. Therefore, as shown in FIG. 8, the cutter set member 6 is moved upward relative to the mounting plate 1 so that the outer circumferential cutter blade 7A and the inner circumferential cutter blade 8A are removed from the stamper 230. In addition, a peeling means having a bent portion 31a at the leading end thereof, such as a takeoff rod 31, may be used to take off the stamper 230. During the takeoff operation, since the outer circumferential cutter blade 7A and the inner circumferential cutter blade 8A are removed from the stamper 230 and the stamper 230 is closely adhered to only the pressing base 15, it is possible to easily take off the stamper 230 using the takeoff rod 31.

It is preferable that the mother stamper be demolded from the base material 225 after it is cooled down to a temperature that is 10° C. or more lower than the glass transition temperature of the front layer 225b. When the demolding is performed at a temperature that is 10° C. higher than the glass transition temperature of the front layer, pattern transfer accuracy may be lowered due to the thermal contraction of the resin stamper 230.

After the stamper 230 is removed from the pressing base 15, another base material 225 is set between the pressing base 15 and the mother stamper 21, as shown in FIG. 9. Then, the heating process, the pressing process, and the punching process described with reference to FIGS. 2 to 8 are sequentially performed on the base material to obtain a stamper 230 by the same method as described above. This operation is repeated to mass-produce the stampers 230.

The stamper 230 manufactured by the above-mentioned method can be used to manufacture a discrete track magnetic recording medium. For example, a structure having a non-magnetic substrate and a magnetic layer or a protective layer formed on the substrate may be given as an example of this type of magnetic recording medium. The magnetic layer and the protective layer are the same as those in the first embodiment, and thus a description thereof will be omitted.

Examples

Manufacture of Multi-Layer Film

A one-component silicone rubber adhesive PURE-SEALANT CLEAR TYPE (manufactured by Shin-Etsu Chemical Co., Ltd., the elastic modulus after curing: 0.76 MPa) was applied with a thickness of 20 µm on a polycarbonate sheet having a thickness of 0.3 mm (PANLITE SHEET PC2151 manufactured by Teijin Chemicals, Ltd, glass transition temperature: 160° C. and tensile modulus: 2.4 GPa), and a cycloolefin polymer sheet with a thickness of 0.1 mm (ZEONOR 1060R manufactured by Zeon Corporation, glass transition temperature: 100° C. and tensile modulus: 2.1 GPa) was formed on the adhesive so as to be planarized. Then, the laminate was maintained at a temperature of 25° C. and 50% RH for one hour.

<Manufacture of Resin Stamper>

The mother stamper was set in the apparatus shown in FIG. 1 with its pattern surface facing upward, and the mold was warmed at a temperature of 70° C. The cutter blades 7 and 8 of the apparatus shown in FIG. 1 were made of stainless steel, and the translucent pressing base 15 was made of tempered glass having a size of 100 mm×100 mm×40 mm. As the mother stamper 21, the following was used: a structure including a doughnut-shaped plate that was manufactured by Ni electroforming and had a thickness of 0.3 mm, an inside diameter of 16 mm, and an outside diameter of 63.5 mm, and a concentric pattern which was formed on the doughnut-shaped plate and had convex and concave portions with a height of 80 nm and a pitch width of 200 nm.

The manufactured laminated film was cut to 70 mm square, and the laminated film was set in the mold of the apparatus shown in FIG. 1 with the cycloolefin polymer surface facing downward, that is, with a transfer surface (which corresponds to the front layer 225b) facing downward.

After the mold was covered, the mold was heated up to 100° C. while the mother stamper was pressed at a pressure of 1 MPa, and pressing was performed for 120 seconds.

The mold was cooled down to 50° C. while continuing the pressing operation, and the inner circumferential cutter blade 8A was used to punch a circular hole having a diameter of 12 mm at the center of the pattern. Then, the mold was opened, and the sample was taken out, thereby manufacturing a resin stamper. A laser microscope was used to inspect random 20 points, and the inspection results showed that the pattern was transferred as designed.

In addition, a measuring microscope was used to measure the deviation of the punched inner circumferential portion from the center of the pattern and the circularity thereof. As the measured results, the deviation was 20 µm. In addition, diameters were measured at two points and the circularity was calculated from the ratio of the diameters. As the measured result, the circularity was 0.006.

<Manufacture of RD Substrate with Resist Film>

A cleaned HD (hard disk) glass substrate (having an outside diameter of 1.89 inches manufactured by Ohara Inc.) was set in a vacuum chamber, and the vacuum chamber was evacuated at $1.0 \times 10^{-5}$ Pa or less in advance.

Then, a 65Fe-25Co-10B (at %) layer having a thickness of 50 nm, a Ru layer having a 0.8 nm, and a 65Fe-25Co-10B (at %) layer having a thickness of 50 nm were sequentially formed on the substrate without heating, and a soft magnetic back layer was formed on the laminate.

Then, an alignment control layer was formed of Ru with a thickness of 20 nm, an oxide granular recording layer was formed of 65Co-10Cr-15Pt-10SiO$_2$ (mol %) with a thickness of 12 nm, and a protective film was formed of carbon with a thickness of 4 nm.

Then, the HD substrate including the protective film was taken out from the vacuum chamber, and a resist (PAK-01-60: trade name, manufactured by Toyo Gosei Co., Ltd.) was applied on the substrate by a spin coater at 2000 rpm. After the application, the substrate was dried on a hot plate at a temperature of about 80° C. for 3 minutes. The thickness of the resist was measured by a reflective/transmissive film thickness meter, and the thickness of the resist was about 80 nm.

<Imprint of Resist Film on HD Substrate Using Resin Stamper>

The manufactured HD substrate (with the resist surface facing downward) and the manufactured resin stamper (with the pattern surface facing upward) were set in this order on a die set of a nanoimprint apparatus ST-200 manufactured by Toshiba Machine Co., Ltd. (with guide pins), and the nanoimprint apparatus was set at a predetermined position.

The nanoimprint apparatus pressed the resin stamper against the substrate at a pressing force of 0.6 MPa for 10 seconds, and radiated ultraviolet rays in the wavelength range of 365 nm with a luminous intensity of 15 mW/cm$^2$ using an LED lamp, without changing the pressing force. Then, the mold was opened and the HD substrate was taken out.

After the resin stamper was removed from the HD substrate, a laser microscope was used to inspect random 20 points, and the inspection results showed that the pattern was transferred as designed at all inspection points. In addition, the laser microscope was used to measure the deviation of the pattern from the center of the HD substrate. As the measured results, the deviation was within 8 µm.

<Example of Using Ni Stamper>

UV imprinting was performed on the resist films of 100 HD media by the same method as described above, except that a cleaned HD glass substrate (having an outside diameter of 1.89 inches manufactured by Ohara Inc.) capable of transmitting ultraviolet rays was used instead of the above-mentioned HD medium, a Ni-electroformed stamper (which has a doughnut shape having a thickness of 0.3 mm, an inside diameter of 12 mm, and an outside diameter of 63.5 mm) having the same pattern as described above was used as the stamper, and the stamper was not changed. In this case, the percent defective was $52/100$.

It is considered that the reason is that defects occur due to dust caught during manufacture, which causes defective samples to be manufactured in the next imprinting process.

INDUSTRIAL APPLICABILITY

The present invention can be applied to a method and apparatus for manufacturing a resin stamper having a pattern transferred thereto and a positioning hole formed at the center or the edge thereof, a magnetic recording medium manufactured by the method and apparatus, and a magnetic recording/reproducing apparatus including the magnetic recording medium.

The invention claimed is:

1. A method of manufacturing a resin stamper, comprising the steps of:
   pressing a resin base material against a mother stamper having a pattern formed on the surface thereof to transfer the pattern of the mother stamper to the surface of the base material by compression molding; and
   punching the base material so that a punched portion is formed inside the pattern forming portion, and
   wherein, after the base material is punched so that the punched portion is formed inside a pattern forming portion, a step (1) of using the punched portion to align the mother stamper with the base material, and pressing the base material against the mother stamper by compression molding to transfer the pattern of the mother stamper to the base material, and a step (2) of curing a portion of the base material are performed.

2. The method of manufacturing a resin stamper according to claim 1,
   wherein the base material is a composite base material including at least one curing resin layer,
   the step of transferring the pattern of the mother stamper to the base material includes:
   a first step of transferring the pattern of the mother stamper to the curing resin layer by compression molding; and
   a second step of radiating active energy beams to the base material or heating the base material to cure a portion of the base material.

3. The method of manufacturing a resin stamper according to claim 2,
   wherein the curing resin is an active energy beam curable resin, and
   the second step is radiating the active energy beams to cure a portion of the composite base material.

4. The method of manufacturing a resin stamper according to claim 2,
   wherein the base material is a film or sheet of a thermoplastic resin or a cured film or sheet of a thermosetting resin having a glass transition temperature (Tg) that is higher than the temperature of a base material during compression molding.

5. The method of manufacturing a resin stamper according to claim 4,
   wherein the base material is a composite base material obtained by applying or printing a curing resin as a liquid on the film or sheet of the thermoplastic resin or the cured film or sheet of a thermosetting resin.

6. The method of manufacturing a resin stamper according to claim 4,
   wherein a film or sheet that transmits 20% or more of ultraviolet rays in the wavelength range of 200 nm to 400 nm is used as the cured film or sheet of the thermoplastic resin or the cured film or sheet of a thermosetting resin.

7. The method of manufacturing a resin stamper according to claim 2,
   wherein a resin selected from at least one of a (meth)acroyl group, an oxetanyl group, a cyclohexene oxide group, and a vinyl ether group is used as the curing resin.

8. The method of manufacturing a resin stamper according to claim 5,
   wherein the film or sheet of the thermoplastic resin or the cured film or sheet of a thermosetting resin is a polyethylene terephthalate film that has one surface subjected to an adhesion process and has a thickness in the range of 5 to 188 μm.

9. The method of manufacturing a resin stamper according to claim 2,
   wherein the active energy beam is ultraviolet rays in the wavelength range of 200 nm to 400 nm.

10. The method of manufacturing a resin stamper according to claim 2,
    wherein the composite base material is obtained by applying or printing a curing resin as a liquid on a film or sheet of a thermoplastic resin or a cured film or sheet of a thermosetting resin having a glass transition temperature (Tg) that is higher than the temperature of a base material during compression molding.

11. The method of manufacturing a resin stamper according to claim 10,
    wherein a step of applying or printing the curing resin as a liquid on the cured film or sheet of the thermoplastic resin or the thermosetting resin to obtain a composite base material, a step of punching the composite base material so that a punched portion is formed inside the pattern forming portion, a step of using the punched portion to align the mother stamper with the composite base material and pressing the composite base material against the mother stamper by compression molding to transfer the pattern of the mother stamper to the composite base material, and a step of curing a portion of the composite base material are continuously performed in this order.

12. A method of manufacturing a resin stamper, comprising the steps of:
    pressing a resin base material against a mother stamper having a pattern formed on the surface thereof to transfer the pattern of the mother stamper to the surface of the base material by compression molding; and
    punching the base material,
    wherein the resin base material has a multi-layer structure including at least a front layer and a base layer,
    the front layer is formed of a thermoplastic resin that has a tensile modulus of 1.5 GPa or more at a temperature of 25° C. and a glass transition temperature of 40° C. or more,
    the base layer is formed of a low-elasticity resin that has a tensile modulus of 1.0 GPa or less at a temperature of 25° C., and during the compression molding, when the glass transition temperature of the resin forming the front layer is $Tg_A$, the front layer is pressed against the mother stamper at a temperature of $(Tg_A-10)°$ C. or more.

13. The method of manufacturing a resin stamper according to claim 12,
wherein the resin base material further includes a rear layer, in addition to the base layer and the front layer, and
the rear layer is formed of a thermoplastic resin or a thermosetting resin that has a tensile modulus of 1.5 GPa or more at a temperature of 25° C. and a glass transition temperature of 40° C. or more.

14. The method of manufacturing a resin stamper according to claim 13,
wherein the rear layer is formed of a resin having a tensile modulus and a glass transition temperature that are greater than those of the resin forming the front layer.

15. The method of manufacturing a resin stamper according to claim 14,
wherein, during the compression molding, when the glass transition temperature of the resin forming the front layer is $Tg_A$ and the glass transition temperature of the rear layer is $Tg_C$, the rear layer is formed at a temperature that is higher than $(Tg_A-10)°$ C. and lower than $Tg_C$.

16. The method of manufacturing a resin stamper according to claim 2,
wherein, in the step of punching the composite base material, the composite base material is punched so that a punched portion is formed inside the pattern forming portion and a circumferential portion is formed outside the pattern formed portion.

17. The method of manufacturing a resin stamper according to claim 1,
wherein the base material has a long stripe shape, and a plurality of openings for aligning having a slit-shaped, formed at both ends in the width direction at a predetermined interval, and has a plurality of the punched portions formed intermittently in the longitudinal direction of the base material,
the resultant each of the punched portions is used to align the mother stamper with the base material, and then the composite base material is pressed against the mother stamper by compression molding, thereby transferring the pattern of the mother pattern stamper to the base material.

18. The method of manufacturing a resin stamper according to claim 2, wherein
the base material has a long stripe shape, and a plurality of openings for aligning having a slit-shaped, formed at both ends in the width direction at a predetermined interval, and has a plurality of the punched portion formed intermittently in the longitudinal direction of the base material,
the resultant each of the punched portions is used to align the mother stamper with the base material, and then the composite base material is pressed against the mother stamper by compression molding, thereby transferring the pattern of the mother pattern stamper to the base material.

19. The method of manufacturing a resin stamper according to claim 2, wherein the pattern is formed on only one surface of the base material.

\* \* \* \* \*